United States Patent
Kusama et al.

(10) Patent No.: US 7,349,911 B2
(45) Date of Patent: *Mar. 25, 2008

(54) DATA PROCESSING METHOD AND APPARATUS

(75) Inventors: Kiyoshi Kusama, Kanagawa-ken (JP); Kunihiro Yamamoto, Kanagawa-ken (JP); Takuya Kotani, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

This patent is subject to a terminal disclaimer.

(21) Appl. No.: 11/086,284

(22) Filed: Mar. 23, 2005

(65) Prior Publication Data

US 2005/0165847 A1    Jul. 28, 2005

Related U.S. Application Data

(62) Division of application No. 09/548,295, filed on Apr. 12, 2000, now Pat. No. 6,886,131.

(30) Foreign Application Priority Data

| Apr. 13, 1999 | (JP) | 11-105741 |
| Apr. 13, 1999 | (JP) | 11-105743 |
| Apr. 13, 1999 | (JP) | 11-105768 |
| Apr. 27, 1999 | (JP) | 11-120714 |

(51) Int. Cl.
*G06F 17/00* (2006.01)

(52) U.S. Cl. ............... 707/100; 707/205; 715/513

(58) Field of Classification Search ............... None
See application file for complete search history.

(56) References Cited

U.S. PATENT DOCUMENTS

| 5,386,297 | A | 1/1995 | Tanaka et al. |
| 5,774,664 | A | 6/1998 | Hidary et al. |
| 5,778,181 | A | 7/1998 | Hidary et al. |
| 5,832,471 | A * | 11/1998 | Fukui ............................ 707/1 |
| 5,937,160 | A * | 8/1999 | Davis et al. ................. 709/203 |
| 5,987,509 | A | 11/1999 | Portuesi |
| 6,061,719 | A | 5/2000 | Bendinelli et al. |
| 6,169,541 | B1 | 1/2001 | Smith |
| 6,173,287 | B1 * | 1/2001 | Eberman et al. ............ 707/102 |
| 6,173,317 | B1 | 1/2001 | Chaddha et al. |
| 6,236,993 | B1 | 5/2001 | Fanberg |
| 6,272,484 | B1 * | 8/2001 | Martin et al. ................... 707/1 |
| 6,356,946 | B1 | 3/2002 | Clegg et al. ................. 709/231 |
| 6,357,042 | B2 | 3/2002 | Srinivasan et al. ............ 725/32 |
| 6,423,893 | B1 | 7/2002 | Sung et al. |
| 6,426,778 | B1 | 7/2002 | Valdez, Jr. |

(Continued)

*Primary Examiner*—Jeffrey Gaffin
*Assistant Examiner*—Jacques Veillard
(74) *Attorney, Agent, or Firm*—Fitzpatrick, Cella, Harper & Scinto

(57) ABSTRACT

Binary data to which meta-data is to be appended, and meta-data to be appended to the binary data are loaded. The meta-data has an XML format. The loaded meta-data is connected after the loaded binary data. The data synthesized in this manner is output as a single file as a whole. In this file data, since header information remains the same as that before connection of the meta-data, binary data can be reproduced by an existing browser or the like. A binary file with meta-data can be discriminated by checking if data in a correct XML format is present at the end of data.

18 Claims, 27 Drawing Sheets

U.S. PATENT DOCUMENTS

| | | |
|---|---|---|
| 6,463,444 B1 | 10/2002 | Jain et al. |
| 6,571,248 B1 | 5/2003 | Kusama ...................... 707/100 |
| 6,629,101 B1 | 9/2003 | Enokida ...................... 707/102 |
| 6,642,966 B1* | 11/2003 | Limaye ...................... 348/473 |
| 6,751,399 B1 | 6/2004 | Okabayashi et al. |
| 6,886,131 B1* | 4/2005 | Kusama et al. ............. 715/513 |
| 2003/0018966 A1 | 1/2003 | Cook et al. |
| 2003/0115219 A1* | 6/2003 | Chadwick ................... 707/200 |

* cited by examiner

| AREA NUMBER | BINARY BITMAP DATA | RECTANGLE POSITION | RECTANGLE SIZE |
|---|---|---|---|
| A1 | BIT INSIDE AREA A1 : 1<br>BIT OUTSIDE AREA A1 : 0 | COORDINATE OF a1 | X1, Y1 |
| A2 | BIT INSIDE AREA A2 : 1<br>BIT OUTSIDE AREA A2 : 0 | COORDINATE OF a2 | X2, Y2 |
| A3 | BIT INSIDE AREA A3 : 1<br>BIT OUTSIDE AREA A3 : 0 | COORDINATE OF a3 | X3, Y3 |

DATA PROCESSING METHOD AND APPARATUS

This application is a division of Application Ser. No. 09/548,295, filed Apr. 12, 2000 (allowed) now U.S. Pat. No. 6,886,131.

FIELD OF THE INVENTION

The present invention relates to a data processing method and apparatus, which process binary data and meta-data, and a storage medium.

The present invention also relates to a data processing method and apparatus, which process image data and area information that pertains to the image data, and a storage medium.

BACKGROUND OF THE INVENTION

Meta-data is "data pertaining to data", and is used as data that explains binary data such as image data, audio data, and the like. However, when binary data and corresponding meta-data are present as independent files, the user must manage the binary data and meta-data at the same time upon moving or copying files, resulting in inconvenience.

In general, in order to facilitate management of binary data and meta-data, various methods that describe binary data and meta-data have been proposed. Such conventional techniques can be categorized into methods of defining new binary formats, and methods that manage those data using databases.

As examples of the method of defining a new binary format, Tiff, Exif, Flashpix, and the like are known as new image formats. FIG. 24 shows the concept of a format in which meta-data is embedded in binary data. As binary data, for example, image data is used. As shown in FIG. 24, a field for describing meta-data is normally allocated in the header field of an image, and the user describes meta-data in that field. By describing meta-data in such way, data can be easily searched and classified. Since binary data includes meta-data, they can be managed by a single file, thus allowing relatively easy file management.

A method of managing binary data and meta-data using a database will be explained below. FIG. 25 shows the concept of the method of managing binary data and meta-data using a database. The method of managing binary data and meta-data, which are present as independent files, using a database or the like, as shown in FIG. 25, is also prevalent. In this case, existing binary data can be used by an existing application without any modifications. However, the method of defining a new format that describes meta-data, and the method of managing meta-data using a database suffer their respective problems.

When a new format that describes meta-data is defined, existing binary data must be converted into the new format, and meta-data must be described in that new format. Furthermore, in order to search binary data using the meta-data in the new format, an application compatible to the new format is required. That is, in order to describe and use meta-data, a large number of steps and dedicated environment are required. Also, in order to process binary data in such new format (e.g., to output an image if the binary data is image data), an application compatible to that format is required, and an existing application cannot cope with this situation.

In addition, since the description method of meta-data is uniquely determined in the new format, a new search routine must be created to create an application that uses meta-data in the new format. Furthermore, in order to describe meta-data in a new field, the specifications of the format must be changed.

On the other hand, when binary data and meta-data are simultaneously managed using a database, meta-data can be neither registered nor used if database software is not available. Also, in order to display registered meta-data, dedicated software is required. Furthermore, when binary data is read out from the database, meta-data does not come with it, i.e., binary data without meta-data is formed.

The aforementioned problems are also posed when, for example, image data is included as binary data, and area information that pertains to an image expressed by that image data is included as meta-data.

Area information is data that pertains to a partial image obtained by extracting an area which has a uniform feature from a still image. This area information is used to detect and recognize objects in an image. However, when no area information is appended to still image data, a still image must undergo area segmentation as a pre-process for detection and recognition of objects in an image. Since area segmentation generally requires huge computer resources and long processing time, the efficiency is poor.

For this reason, it is demanded to manage such area information in correspondence with still image data, as described above. However, when still image data and corresponding area information are present as independent files, the user must manage the still image data and area information at the same time upon moving or copying files, resulting in inconvenience.

Conventionally, no attempt to manage still image data and its area information, as described above, has been made. However, the method of managing these two data in association with each other can be generally classified into a method of defining a new image format and a method of managing those data using a database, as has been explained for binary data and meta-data.

As examples of the method of defining a new binary format for still image data, Tiff, Exif, Flashpix, and the like are known as new image formats. FIG. 26 shows the concept of a format in which meta-data is embedded in binary data. That is, FIG. 26 shows the concept of a format in which area information is embedded in still image data. In this manner, when a field for describing area information is allocated in the header field of an image, and area information that pertains to the image is stored in that field, they can be managed as a single file, thus allowing relatively easy file management.

On the other hand, image data and area information are managed using a database as follows. FIG. 27 shows the concept of a method of managing still image data and area information using a database. As shown in FIG. 27, a method of managing still image data and area information which are present as independent files using a database or the like is available. In this case, still image data is not modified at all, and existing still image data can be directly used by an existing application.

However, the method of defining a new format that describes area information, and the method of managing meta-data using a database respectively suffer the same problems as those of management of binary data and meta-data.

That is, when a new format that describes area information is defined, existing still image data must be converted into the new format, and area information must be described in that new format. Furthermore, in order to use area information in the new format, an application compatible to the new format is required. That is, in order to describe and use area information, a large number of steps and dedicated environment are required. Also, in order to process still image data in such new format (e.g., to output an image if it is image data), an application compatible to that format is required, and an existing application cannot cope with such situation.

In addition, since the description method of area information is uniquely determined in the new format, a new read routine of area information must be created to create an application that uses area information in the new format. Furthermore, in order to describe area information in a new field, the specifications of the format must be changed.

On the other hand, when still image data and area information are simultaneously managed using a database, area information can be neither appended nor used if database software is not available. Furthermore, when only still image data is read out from the database, area information does not come with it, i.e., still image data without area information is formed.

SUMMARY OF THE INVENTION

The present invention has been made in consideration of the aforementioned problems posed in description and search of meta-data, and has as its object to allow registration of meta-data in binary data without any influences on existing applications.

It is another object of the present invention to provide binary data registered with meta-data in a format that can be processed by an existing application.

It is still another object of the present invention to allow use of existing tools for a data description language by describing meta-data using a general data description language, so as to facilitate development of a compatible application.

It is still another object of the present invention to extract meta-data from binary data in which the meta-data is described, so as to be able to use it in processes such as search, reference, change, and the like.

It is still another object of the present invention to allow more accurate discrimination of the presence/absence of meta-data by registering confirmation information such as a check sum together with meta-data, and discriminating the meta-data using the confirmation information.

It is still another object of the present invention to allow easy discrimination of binary data registered with meta-data by registering meta-data and its size in binary data.

It is still another object of the present invention to allow appending of area information to still image data without any influences on existing applications.

It is still another object of the present invention to provide still image data registered with area information in a format that can be processed by an existing application.

It is still another object of the present invention to allow use of existing tools for a data description language by describing area information using a general data description language, so as to facilitate development of a compatible application.

It is still another object of the present invention to extract area information from still image data in which the area information is described, so as to be able to use it in various processes.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
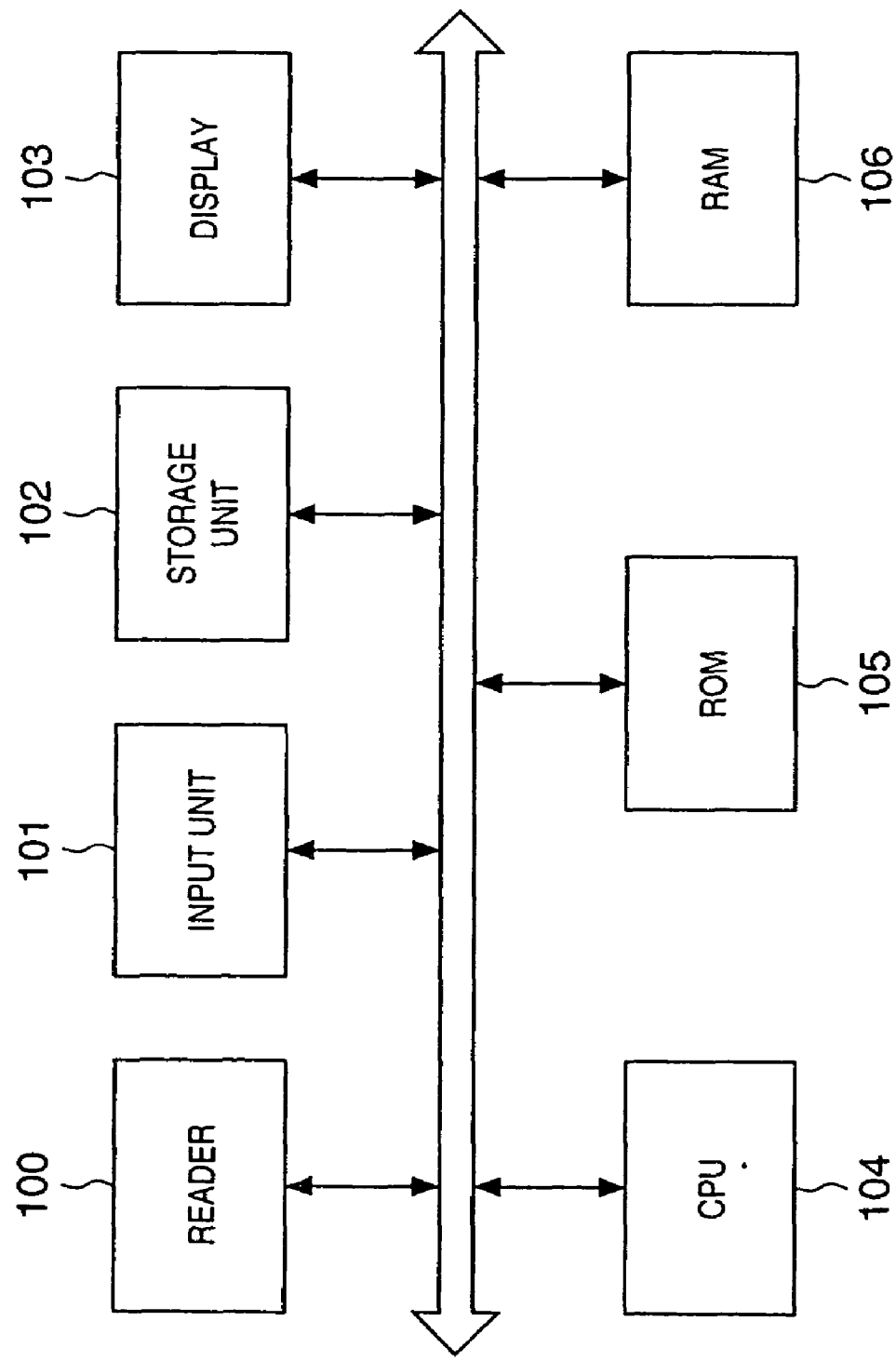
FIG. 1 is a block diagram showing the arrangement of a data processing apparatus according to the first embodiment of the present invention.

FIG. 1 is a block diagram showing the arrangement of a data processing apparatus according to the first embodiment. Referring to FIG. 1, reference numeral 100 denotes a reader, which reads an image using, e.g., a scanner device. Reference numeral 101 denotes an input unit which is used by the user to input an instruction and data, and includes a keyboard and pointing device. Reference numeral 102 denotes a storage unit which stores binary data and meta-data. A hard disk is normally as the storage unit 102. Reference numeral 103 denotes a display which displays binary data stored in the storage unit 102, and image data read by the reader 100. A CRT or liquid crystal display device is normally used as the display 103.

Reference numeral 104 denotes a CPU which is involved in all processes of the aforementioned building components, and a ROM 105 and RAM 106 provide programs, data, or a work area required for such processes to the CPU 104. Note that a control program that implements the processing sequence of this embodiment (to be described later with reference to FIG. 2) is also stored in the ROM 105. Of course, that control program may be stored in the storage unit 102, and may be loaded onto the RAM 106 upon being executed by the CPU 104.

Note that the data processing apparatus of the first embodiment has various other building components in addition to those described above, but they are not the gist of the present invention, and a detailed description thereof will be omitted.

Figure 2:
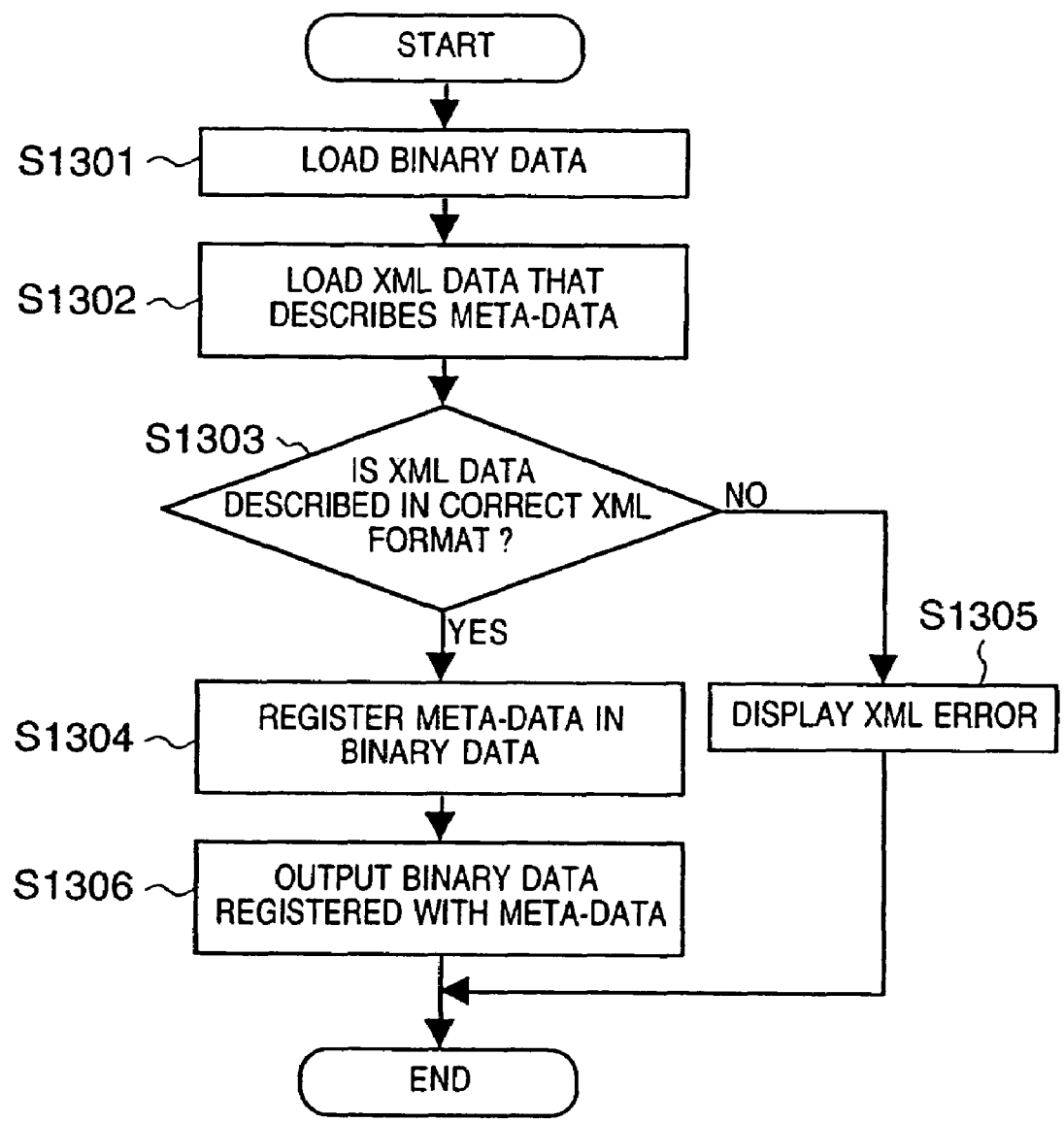
FIG. 2 is a flow chart for explaining a meta-data registration process according to the first embodiment.

A process for registering meta-data in binary data in the data processing apparatus with the aforementioned arrangement will be explained below. FIG. 2 is a flow chart for explaining the meta-data registration process according to the first embodiment.

Referring to FIG. 2, binary data designated by the user is loaded onto a memory (RAM 106) in step S1301. For example, the binary data is designated by inputting a desired binary data file name at the keyboard, or indicating an icon of the corresponding binary data using the pointing device (e.g., a mouse). In step S1302, an XML file which is designated by the user and describes meta-data is loaded onto the memory (RAM 106). This XML file is also designated by inputting a file name at the keyboard or indicating the corresponding icon by the pointing device (e.g., a mouse).

It is checked in step S1303 if the XML file that describes meta-data is XML data in a correct format. The correct format is discriminated by checking if the description format of an XML file is satisfied (e.g., if the right and left parentheses of tags correctly form pairs, if a tag assignment format is correct, and so forth). Note that it is also checked if XML data is correct as well as if it has a correct format. Whether or not XML data is correct can be determined by checking, e.g., if XML data is described in accordance with a schema such as DTD (Document Type Definition) or the like.

If it is determined in step S1303 that the XML file is not XML data in the correct format, the flow advances to step S1305. In step S1305, an XML data error is displayed on the display 103, thus ending this process.

On the other hand, if it is determined in step S1303 that the XML file is XML data in the correct format, the flow advances to step S1304. In step S1304, meta-data is registered by connecting that meta-data to the end of the binary data loaded onto the memory in step S1301. After that, the binary data registered with the meta-data is output in step S1306, thus ending the process. Note that data having a data structure shown in FIG. 3 is stored as one file in the storage unit 102 upon outputting data in step S1306.

Figure 3:
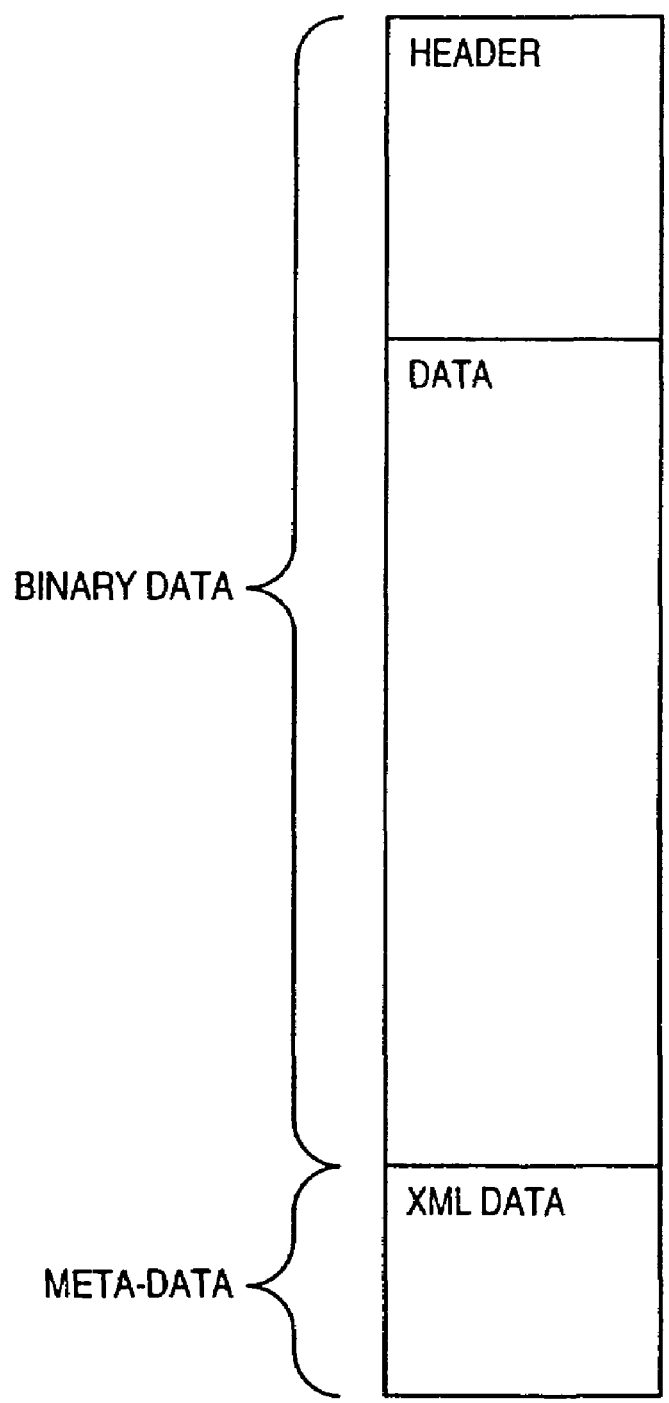
FIG. 3 is a view for explaining the registration state of meta-data in binary data according to the first embodiment.

FIG. 3 is a view for explaining the registration state of meta-data in binary data according to the first embodiment. As shown in FIG. 3, by connecting meta-data described in XML data to the end of binary data, meta-data can be registered without any influences on other applications. More specifically, since information in the header field of binary data remains the same as that before connection of meta-data, if binary data is, e.g., image data, an image can be reproduced by a conventional browser (connected meta-data is ignored).

Furthermore, since meta-data is described in XML, if a tool that can interpret XML data is available, meta-data can be added, changed, and referred to, when the XML data contents are extracted, thus assuring very high compatibility. Note that extraction of XML data contents will be described in detail in the second embodiment.

As described above, according to the first embodiment, when meta-data is described in XML and that XML data is connected to the end of binary data, meta-data can be registered in existing binary data.

More specifically, according to the first embodiment, by connecting meta-data which is described in a correct format in a predetermined data description language to the end of binary data, meta-data can be registered to existing binary data without any influence on existing applications. That is, binary data registered with meta-data can be provided in a format that can be processed by an existing application. When an existing data description language is used as that for describing meta-data, existing tools of that data description language can be used upon edit, reference, and the like of meta-data, thus saving extra efforts for development.

Second Embodiment

In the first embodiment, the method of registering meta-data to binary data has been explained. In the second embodiment, a process for discriminating whether or not meta-data is registered to binary data, and extracting the meta-data if it is registered will be explained. Note that the arrangement of the data processing apparatus in the second embodiment is the same as that in the first embodiment (FIG. 1), and a detailed description thereof will be omitted.

Figure 4:
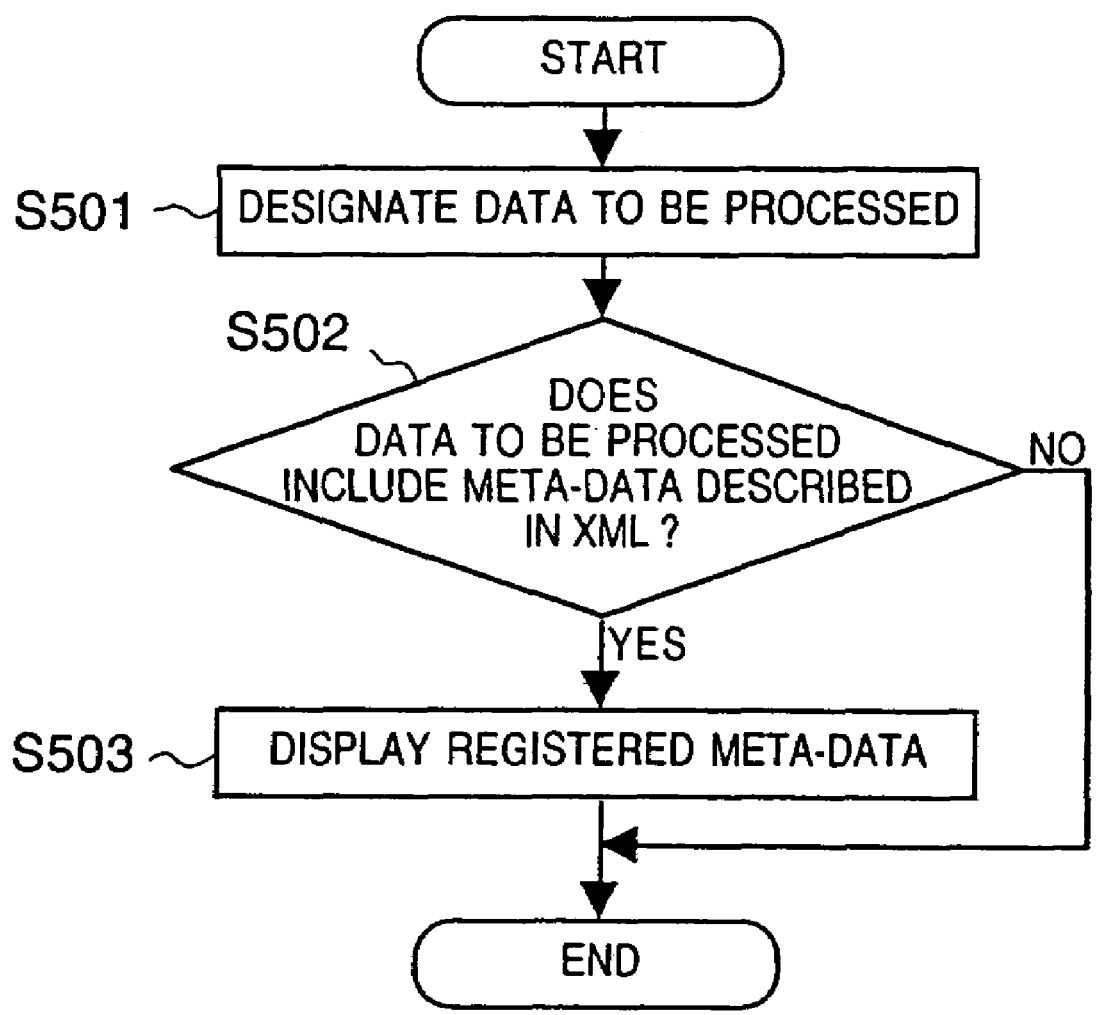
FIG. 4 is a flow chart showing the discrimination/extraction sequence of the registered meta-data according to the second embodiment of the present invention.

The processes for discriminating whether or not meta-data that has been explained in the first embodiment is registered in data of a designated file, and extracting the registered meta-data will be explained below. FIG. 4 is a flow chart showing the discrimination/extraction sequence of registered meta-data according to the second embodiment. In this embodiment, the extracted meta-data is displayed on the display 103, but the present invention is not limited to such specific output mode. For example, it is known to those who are skilled in the art that the extracted meta-data may be provided to a search process.

Referring to FIG. 4, a file which is to undergo discrimination as to whether or not meta-data is registered, i.e., data to be processed, is designated by a user instruction in step S501. The data to be processed is designated in step S501 by inputting the file name of the binary data at the keyboard or indicating a corresponding icon using the pointing device (mouse).

Figure 5:
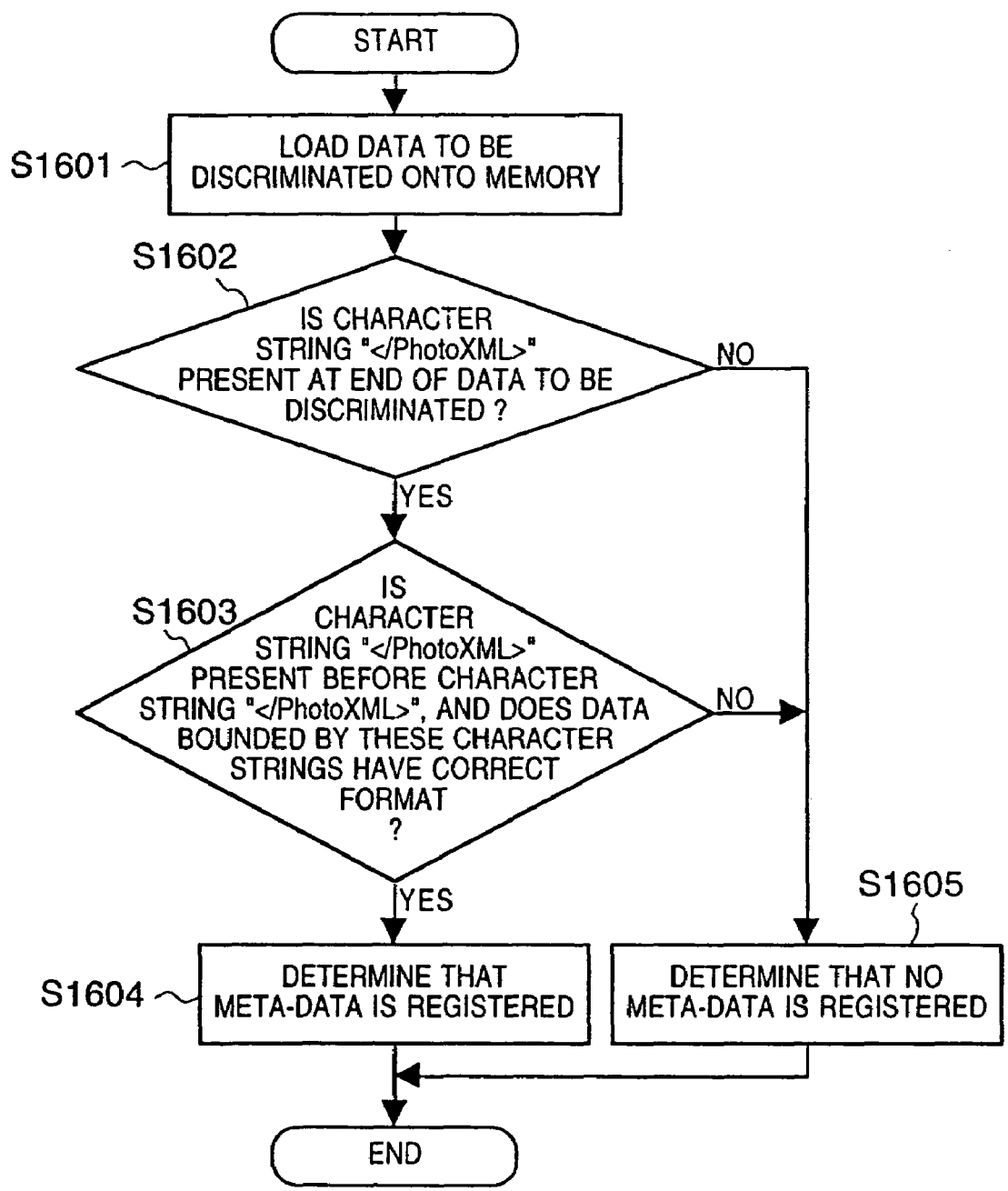
FIG. 5 is a flow chart for explaining details of a meta-data discrimination process according to the second embodiment.
Figure 6:
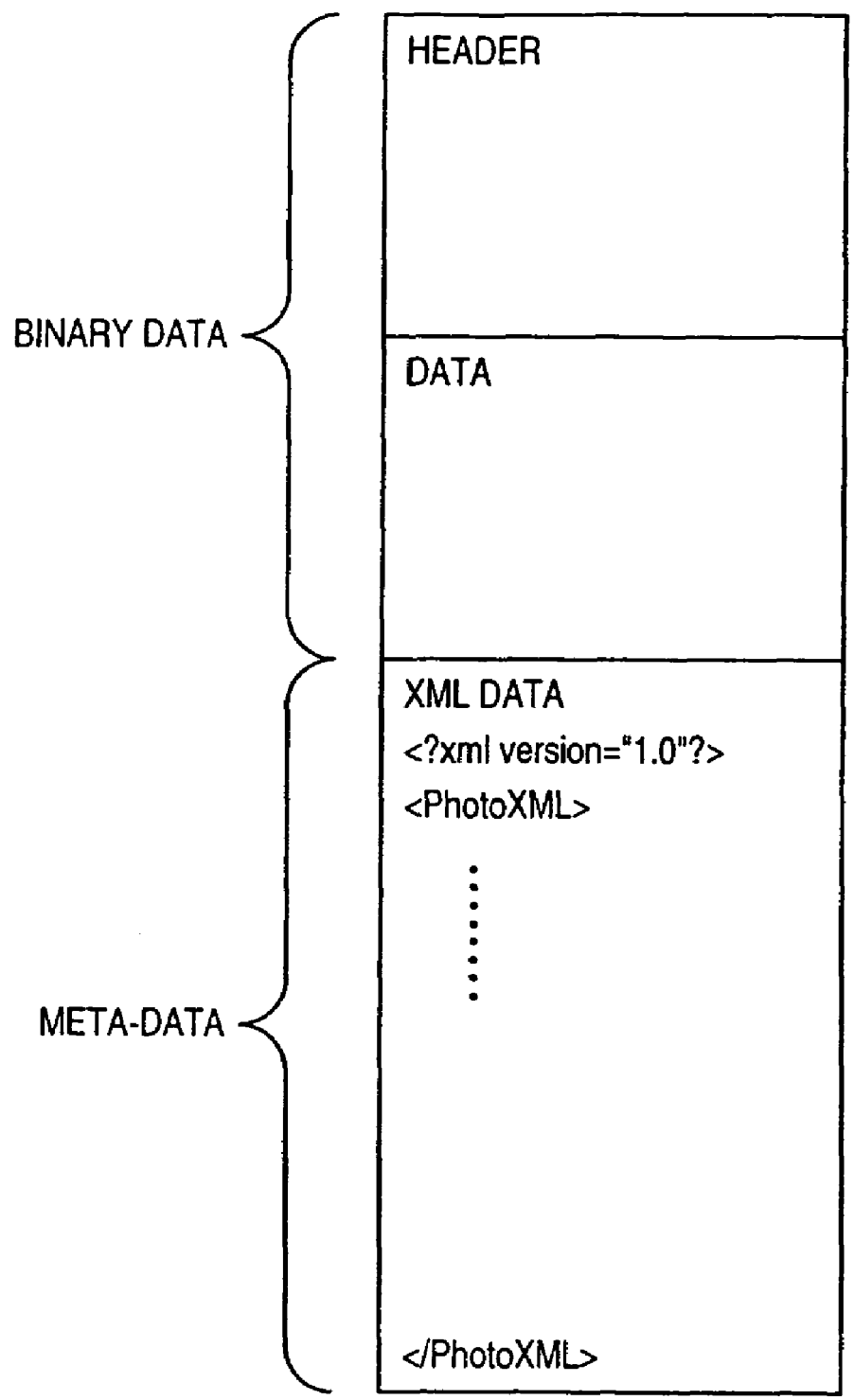
FIG. 6 shows an example of the data format of binary data in which XML data is registered as meta-data.

It is discriminated in step S502 if meta-data described in XML is registered in data of the designated file. Details of the discrimination process in step S502 will be explained below with reference to the flow chart in FIG. 5 and a schematic view in FIG. 6. FIG. 5 is a flow chart for explaining details of the meta-data discrimination process according to the second embodiment. FIG. 6 shows an example of the data format of binary data in which XML data is registered as meta-data.

As has been explained in the first embodiment, the data format of the data to be processed in which XML data as meta-data is registered is as shown in FIG. 6. Hence, the presence/absence of meta-data is discriminated as follows.

As shown in FIG. 5, the entire data of the file designated in step S501 (the entire data to be processed) is loaded onto the memory (RAM 106) in step S1601. Since the data output in step S1306 in the first embodiment is managed as a single file, the entire data can be read out by a general file management system.

It is checked in step S1602 if a character string "</PhotoXML>" is present at the end of data loaded in step S1601. If such character string is not present, the flow advances to step S1605.

On the other hand, if the character string "</PhotoXML>" is present at the end of the loaded data to be processed, the flow advances to step S1603. It is checked in step S1603 if a character string "<PhotoXML>" is present before the character string "</PhotoXML>", and it is also confirmed if data bounded by these character strings is described in a correct XML format. At this time, it may be further checked if that data is correct XML data. Whether or not the data has a correct format and is correct can be discriminated, as has been explained in the first embodiment (step S1303).

If it is confirmed in step S1603 that the data has a correct format, the flow advances to step S1604. It is concluded in step S1604 that meta-data is registered, and this process ends. On the other hand, if a correct format is not confirmed in step S1603, the flow advances to step S1605. It is concluded in step S1605 that meta-data is not registered. That is, if it is determined in step S1602 that the character string "</PhotoXML>" is not present at the end of the binary data of interest, if it is determined in step S1603 that the character string "<PhotoXML>" is not present, or if it is determined in step S1603 that described contents bounded by the character strings are incorrect, the flow advances to step S1605 to determine that no meta-data is registered in the data to be processed.

In this manner, discrimination of meta-data ends.

Referring back to the flow chart in FIG. 4, if it is concluded by the process shown in the flow chart in FIG. 5 that meta-data is registered, the flow advances to step S503. In step S503, the contents of the registered meta-data are displayed on the basis of XML data bounded by the character strings "<PhotoXML>" and "</PhotoXML>", thus ending the process. On the other hand, if it is determined in step S502 that no meta-data is registered, the process ends.

Figure 7:
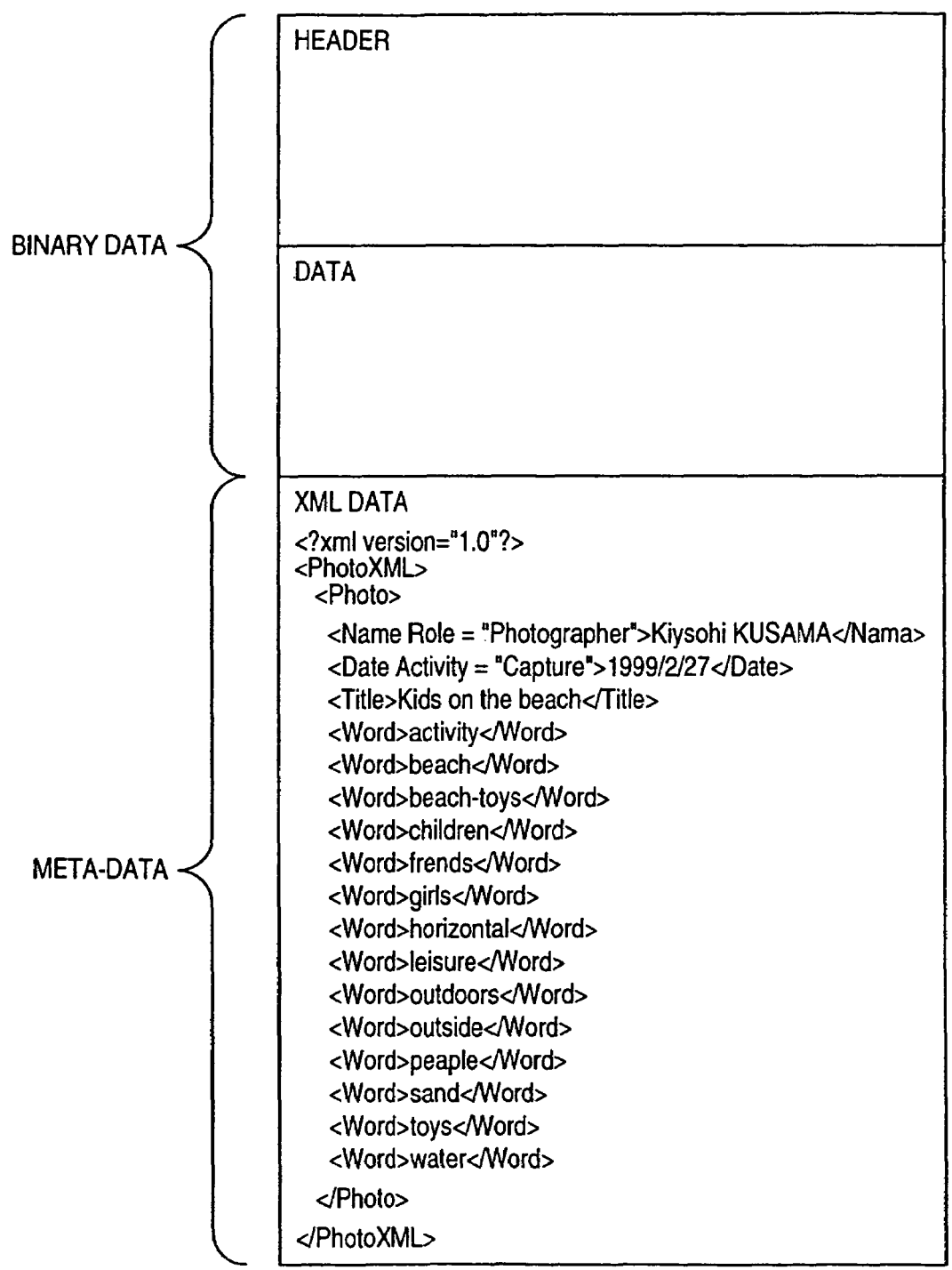
FIG. 7 shows an example of binary data registered with meta-data which is described in a correct XML format.

FIG. 7 shows an example of binary data with meta-data, i.e., in which meta-data described in a correct XML format is registered. The meta-data shown in FIG. 7 records information such as "photographer", "date", "title", "keyword", and the like of an image. Therefore, by discriminating meta-data in the aforementioned sequence, a search and the like can be made using such information. Furthermore, information such as "shutter speed", "exposure time", and the like upon capturing an image can be recorded in the meta-data, and an image can be automatically corrected using these pieces of information.

As described above, according to the second embodiment, binary data with meta-data, and normal binary data can be discriminated by checking if XML data is described at the end of data in a correct format. If meta-data is found, that meta-data can be displayed.

More specifically, according to the second embodiment, binary data registered with meta-data can be discriminated from that registered with no meta-data, and the registered meta-data can be extracted. Therefore, when an existing data description language is used as that for describing meta-data, existing tools of that data description language can be used in a search process using meta-data, thus saving extra efforts for development.

In each of the above embodiments, XML data is used as meta-data. However, the present invention is not limited to such specific data. For example, other data description languages such as SGML, HTML, and the like may be used. Also, still image data, moving image data, audio data, and the like can be used as binary data.

Third Embodiment

In the first embodiment, meta-data in the XML format is simply connected to the end of binary data. In the third embodiment, meta-data and its check sum are appended to the end of binary data. In this manner, meta-data can be registered in existing binary data without any influences on an existing application, and the presence/absence of meta-data can be discriminated more reliably.

Note that the arrangement of the data processing apparatus in the third embodiment is the same as that in the first embodiment (FIG. 1), and a detailed description thereof will be omitted.

Figure 8:
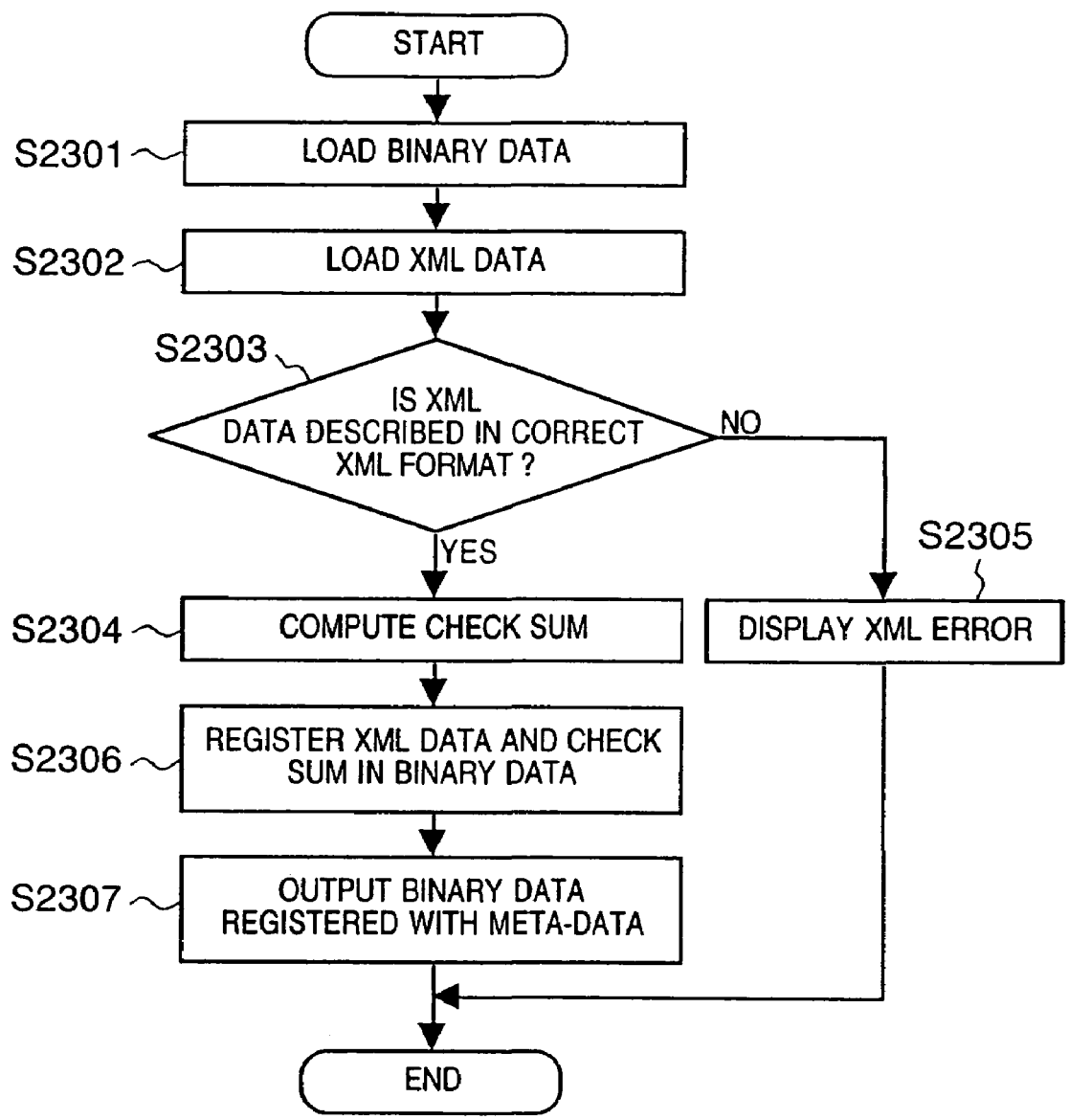
FIG. 8 is a flow chart for explaining a meta-data registration process according to the third embodiment of the present invention.

FIG. 8 is a flow chart for explaining a meta-data registration process according to the third embodiment.

Referring to FIG. 8, binary data designated by the user is loaded onto the memory (RAM 106) in step S2301. In this case, the binary data is designated by inputting a desired binary data file name at the keyboard, or indicating an icon of the corresponding binary data using the pointing device (e.g., a mouse). In step S2302, an XML file which is designated by the user and describes meta-data is loaded onto the memory (RAM 106). This XML file is also designated by inputting a file name at the keyboard or indicating the corresponding icon by the pointing device (e.g., a mouse).

It is checked in step S2303 if the XML file that describes meta-data is XML data in a correct format. The correct format is discriminated by checking if the description format of an XML file is satisfied (e.g., if the right and left parentheses of tags correctly form pairs, if a tag assignment format is correct, and so forth). Note that it is also checked if XML data is correct as well as if it has a correct format. Whether or not XML data is correct can be determined by checking, e.g., if XML data is described in accordance with a schema such as DTD (Document Type Definition) or the like.

If it is determined in step S2303 that the XML file is not XML data in the correct format, the flow advances to step S2305. In step S2305, an XML data error is displayed on the display 103, thus ending this process.

On the other hand, if it is determined in step S2303 that the XML file is XML data in the correct format, the flow advances to step S2304. In step S2304, a check sum of the meta-data of interest is computed. As the check sum, a numerical value that can be uniquely determined from the meta-data (for example, the meta-data size (the number of bytes), the number of characters, the number of words, the number of lines, the number of items bounded by tags, and the like) is used. If two or more of these are used at the same time, a check sum with higher precision can be obtained. Also, the numerical values used as the check sum (or the method of computing the check sum) may be described as XML data for the meta-data discrimination process to be described later in the fourth embodiment.

In step S2306, the meta-data and check sum are registered at the end of the binary data loaded in step S2301. Furthermore, the binary data obtained by registering the meta-data is output in step S2307, thus ending the process.

Figure 9:
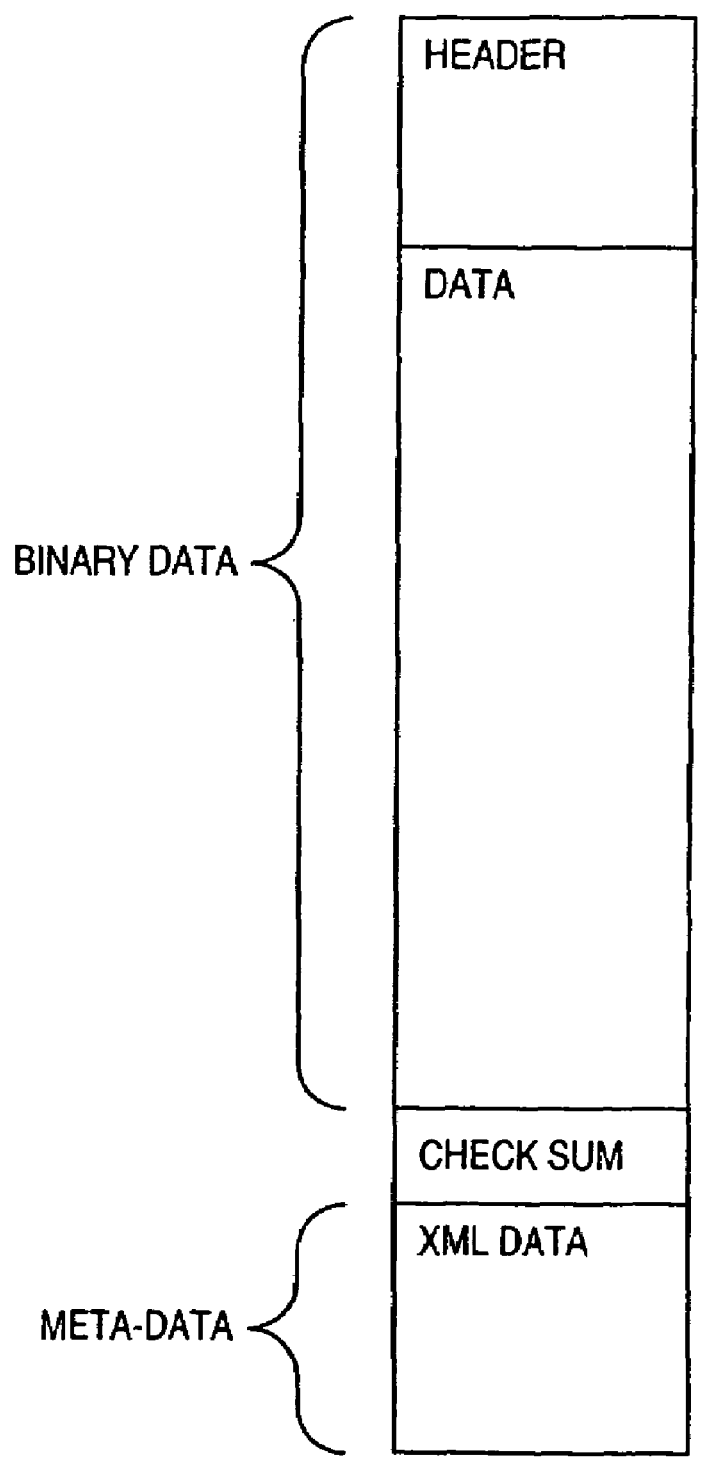
FIG. 9 is a view for explaining the registration state of meta-data in binary data according to the third embodiment.

FIG. 9 is a view for explaining the registered state of meta-data in binary data according to this embodiment. As shown in FIG. 9, a check sum and meta-data described in XML data are connected to the end of binary data. In this manner, meta-data can be registered without any influences on other applications. More specifically, assuming that binary data is standard JPEG image data, even when meta-data is appended to the end of that image data, an image can be loaded by a commercially available image application (that does not recognize meta-data) without posing any problems. That is, since information in the header field of binary data remains the same as that before connection of meta-data, if binary data is, e.g., image data, an image can be reproduced by a conventional browser (connected meta-data is ignored).

Furthermore, since meta-data is described in XML, if a tool that can interpret XML data is available, meta-data can be added, changed, and referred to, when the XML data contents are extracted, thus assuring very high compatibility. Note that extraction of XML data contents registered in this way will be described in detail in the fourth embodiment.

As described above, according to the third embodiment, when meta-data is described in XML and that XML data is connected to the end of binary data, meta-data can be registered in existing binary data.

More specifically, according to the third embodiment, by connecting meta-data (data in an XML format and check sum) which is described in a correct format in a predetermined data description language to the end of binary data, meta-data can be registered in existing binary data without any influence on existing applications. That is, binary data registered with meta-data can be provided in a format that can be processed by an existing application. When an existing data description language is used as that for describing meta-data, existing tools of that data description language can be used upon edit, reference, and the like of meta-data, thus saving extra efforts for development.

In the above embodiment, correctness of XML data is checked, but whether or not data is well-formed may be checked instead. Also, the meta-data format is not limited to XML, and other formats such as SGML, HTML, and the like may be used.

Fourth Embodiment

In the third embodiment, the method of registering meta-data in binary data has been explained. In the fourth embodiment, a process for discriminating whether or not meta-data is registered to binary data, and extracting the meta-data if it is registered will be explained. Note that the arrangement of the data processing apparatus in the fourth embodiment is the same as that in the first embodiment (FIG. 1), and a detailed description thereof will be omitted.

The processes for discriminating whether or not meta-data that has been explained in the third embodiment is registered in data of a designated file, and extracting the registered meta-data will be explained below. The meta-data determination/extraction sequence of the fourth embodiment is the same as that shown in FIG. 4 in the second embodiment, and will be explained while citing FIG. 4. In this embodiment, the extracted meta-data is displayed on the display 103, but the present invention is not limited to such specific output mode. For example, it is known to those who are skilled in the art that the extracted meta-data may be provided to a search process.

Referring to FIG. 4, a file which is to undergo discrimination as to whether or not meta-data is registered is designated by a user instruction in step S501. The file to be processed (data to be processed) is designated in step S501 by inputting the file name of the binary data at the keyboard or indicating a corresponding icon using the pointing device (mouse).

Figure 10:
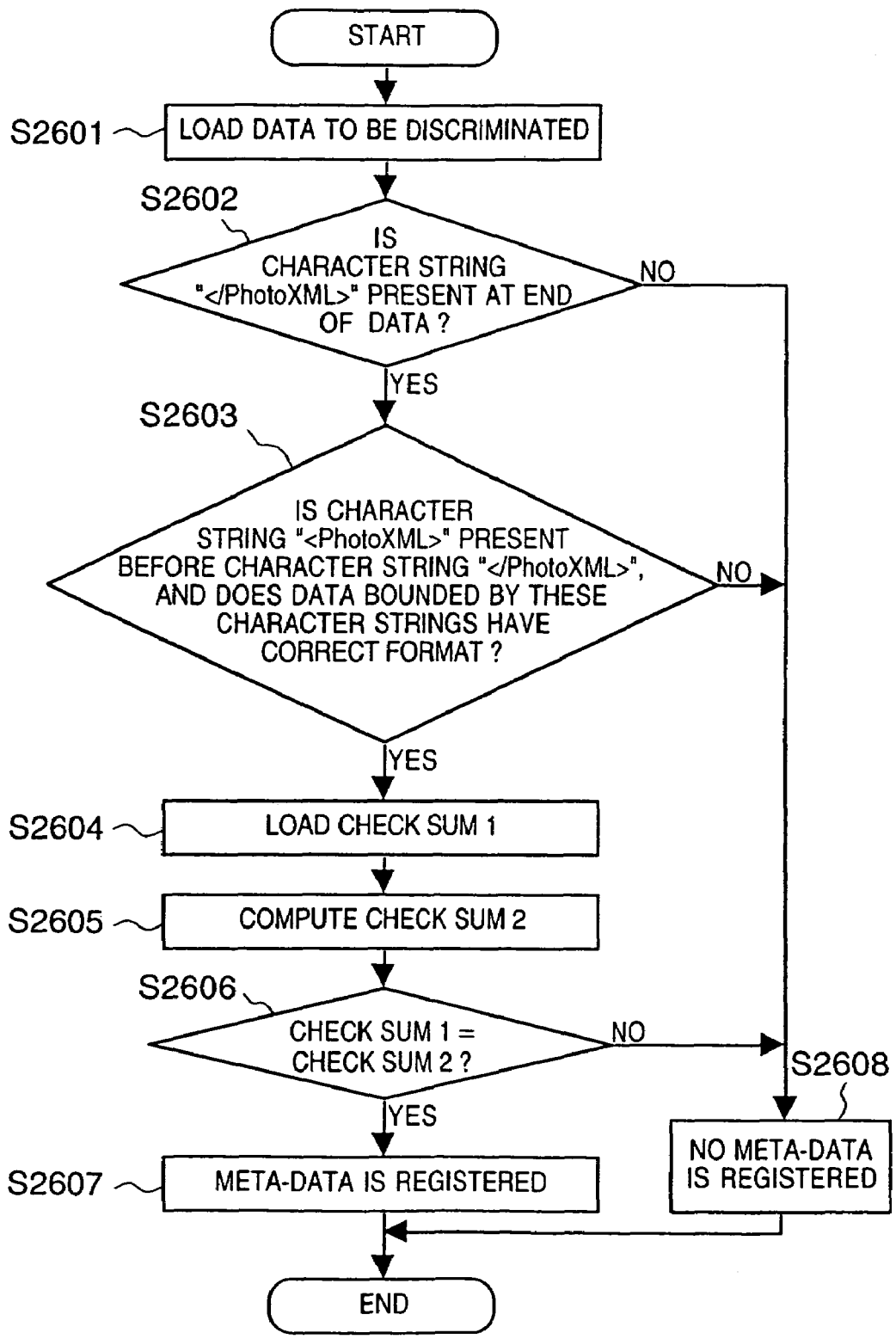
FIG. 10 is a flow chart for explaining details of a meta-data discrimination process according to the fourth embodiment of the present invention.
Figure 11:
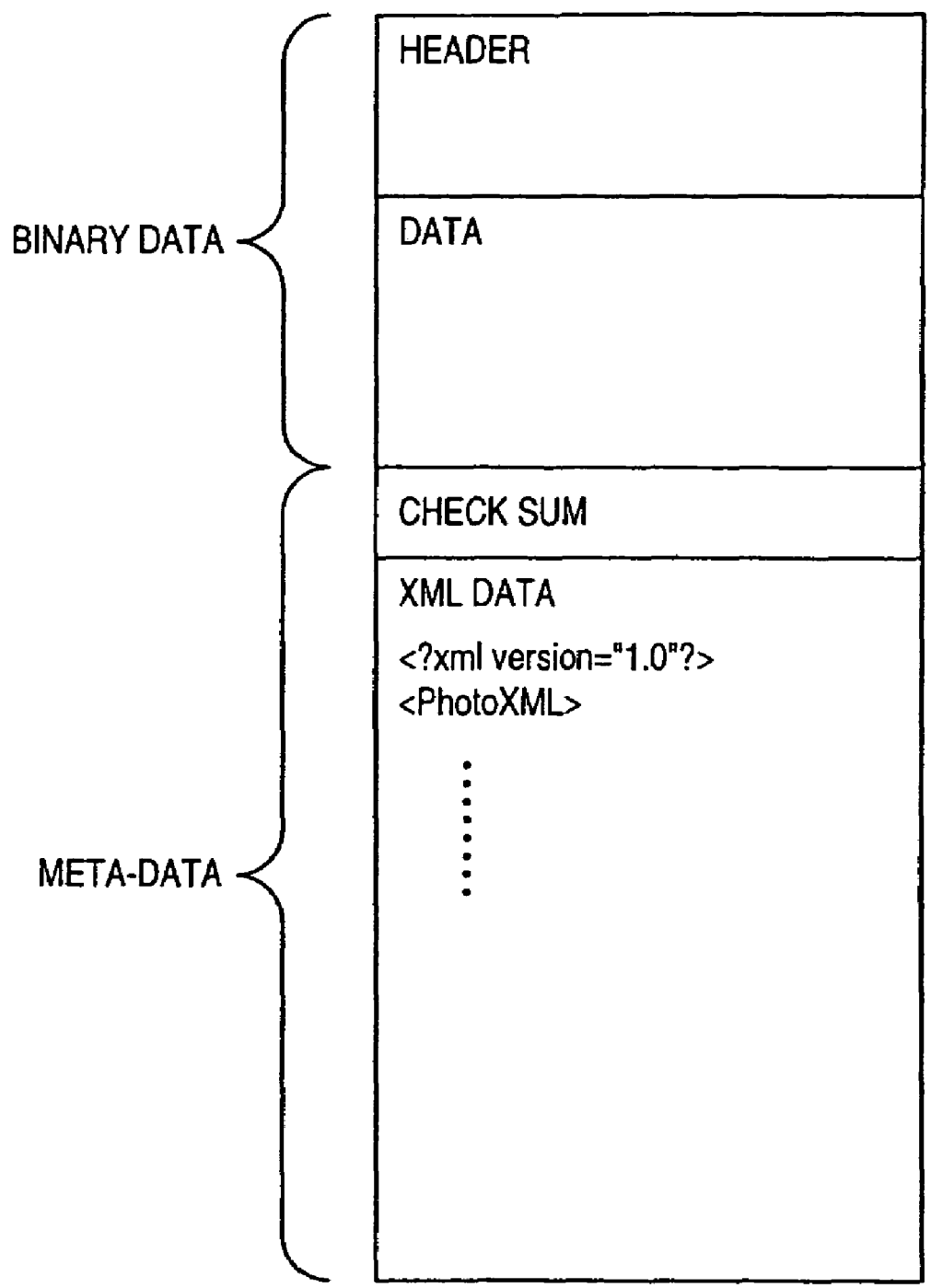
FIG. 11 shows an example of the data format of binary data in which XML data is registered as meta-data in the fourth embodiment.

It is discriminated in step S502 if meta-data described in XML is registered in data of the designated file. Details of the discrimination process in step S502 will be explained below with reference to the flow chart in FIG. 10 and a schematic view in FIG. 11. FIG. 10 is a flow chart for explaining details of the meta-data discrimination process according to the fourth embodiment. FIG. 11 shows an example of the data format of binary data in which XML data is registered as meta-data.

As has been explained in the third embodiment, the data format of the data to be processed in which XML data as meta-data is registered is as shown in FIG. 11. Hence, the presence/absence of meta-data is discriminated as follows.

As shown in FIG. 10, the entire data of the file designated in step S501 (the entire data to be processed) is loaded onto the memory (RAM 106) in step S2601. Since the data output in step S2307 in the third embodiment is managed as a single file, the entire data can be read out by a general file management system.

It is checked in step S2602 if a character string "</PhotoXML>" is present at the end of data loaded in step S2601. If such character string is not present, the flow advances to step S2608, and it is concluded that no meta-data is registered in that data to be processed.

On the other hand, if the character string "</PhotoXML>" is present at the end of the loaded data, the flow advances to step S2603. It is checked in step S2603 if a character string "<PhotoXML>" is present before the character string "</PhotoXML>", and it is also confirmed if data bounded by these character strings is described in a correct XML format. At this time, it may be further checked if that data is correct XML data. Whether or not the data has a correct format and is correct can be discriminated, as has been explained in the third embodiment (step S2303).

If it is confirmed in step S2603 that the data has a correct format, the flow advances to step S2604. In step S2604, a check sum stored immediately before the character string <PhotoXML> is loaded, and is held as check sum 1. Subsequently, in step S2605 a check sum of the meta-data which has been confirmed to have the correct format is computed, and is held as check sum 2. Note that the check sum is computed by the same method as that used in the process upon connecting meta-data described in the third embodiment. For example, when "the number of characters" is used as the check sum upon connecting meta-data, "the number of characters" is computed as a check sum in this process.

In step S2606, check sums 1 and 2 are compared, and if they are equal to each other, the flow advances to step S2607 to conclude that meta-data is registered. On the other hand, if the two check sums are not equal to each other, the flow advances to step S2608. That is, if it is determined in step S2602 that the character string "</PhotoXML>" is not present at the end of the binary data of interest, if it is determined in step S2603 that the character string "<PhotoXML>" is not present, if it is determined in step S2603 that described contents bounded by the character strings are incorrect, or if it is determined in step S2606 that the two check sums are not equal to each other, the flow advances to step S2608 to conclude that no meta-data is registered in the data to be processed.

In this manner, discrimination of meta-data ends.

Referring back to the flow chart in FIG. 4, if it is concluded by the process shown in the flow chart in FIG. 10 that meta-data is registered, the flow advances to step S503. In step S503, the contents of the registered meta-data are displayed on the basis of XML data bounded by the character strings "<PhotoXML>" and "</PhotoXML>", thus ending the process. On the other hand, if it is determined in step S502 that no meta-data is registered, the process ends.

As described above, according to the fourth embodiment, binary data with meta-data, and normal binary data can be discriminated by checking if XML data is described at the end of data in a correct format. If meta-data is found, that meta-data can be displayed.

More specifically, according to the fourth embodiment, binary data registered with meta-data can be discriminated from that registered with no meta-data, and the registered meta-data can be extracted. Therefore, when an existing data description language is used as that for describing meta-data, existing tools of that data description language can be used in a search process using meta-data, thus saving extra efforts for development.

According to the above embodiment, since a check mechanism such as a check sum or the like for discriminating meta-data is provided, the meta-data can be discriminated more accurately.

In the above embodiment, XML data is used as meta-data. However, the present invention is not limited to such specific data. For example, other data description languages such as SGML, HTML, and the like may be used. Of course, the character strings used (<PhotoXML> and </PhotoXML> are used in the above embodiment) and the way correctness is discriminated change depending on the data description language used, and are not particularly limited by the above embodiments. Also, still image data, moving image data, audio data, and the like can be used as binary data.

As has been explained in the third embodiment, various check sums can be used. On the other hand, a check sum mode (e.g., "the number of characters" or the like) may be described in an entity of meta-data (in XML data in the above embodiment), and a check sum may be computed according to that description upon data discrimination.

In the fourth embodiment, the presence/absence of meta-data is discriminated using a check sum. Also, by confirming correctness (e.g., validity or well-formedness) of XML itself, more accurate discrimination can be achieved.

Fifth Embodiment

In the third embodiment, a check sum is registered to discriminate the presence/absence of meta-data accurately. In this embodiment, the presence/absence of meta-data is discriminated more accurately using size information and a marker code.

Note that the arrangement of the data processing apparatus in the fifth embodiment is the same as that in the first embodiment (FIG. 1), and a detailed description thereof will be omitted.

Figure 12:
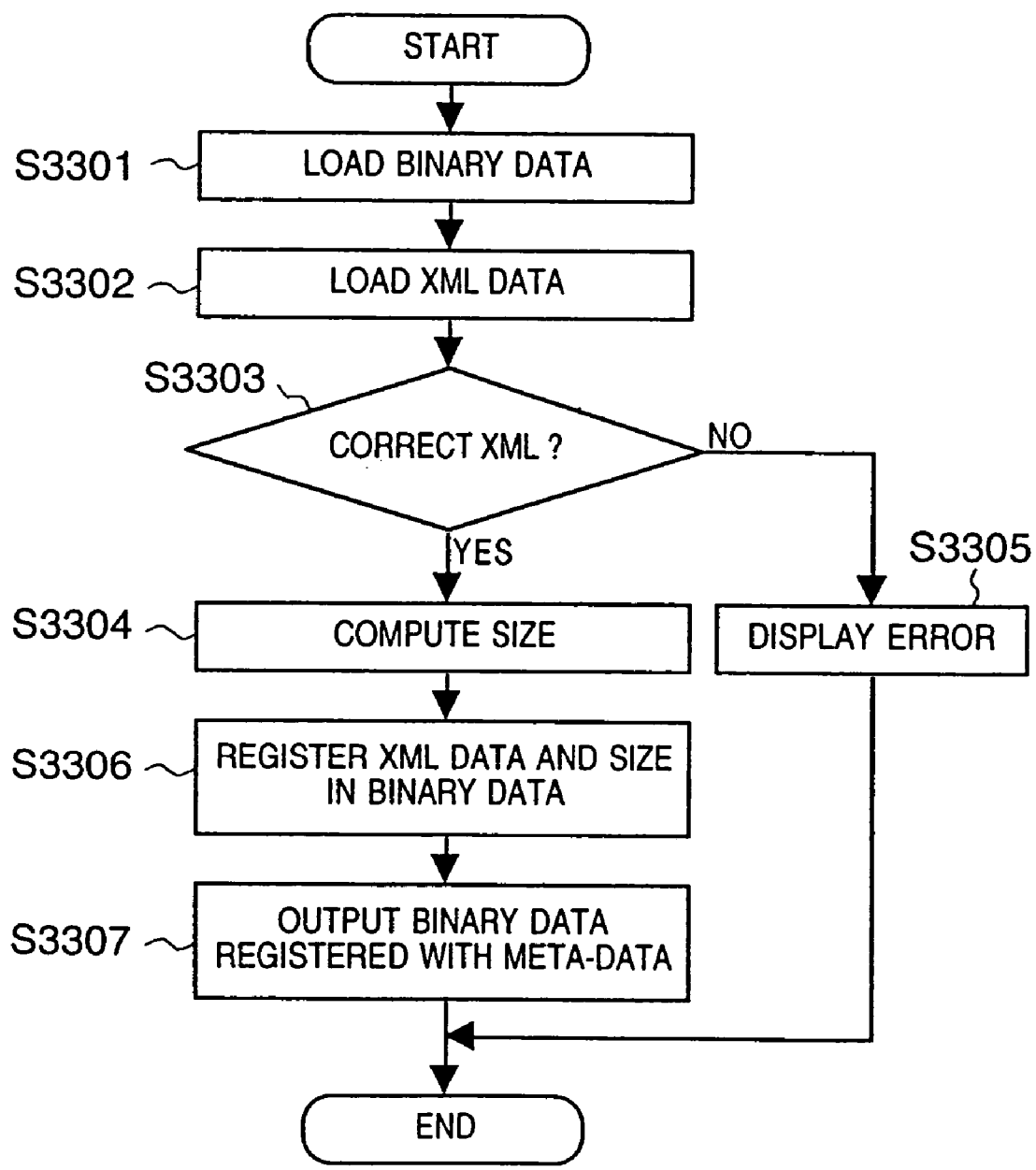
FIG. 12 is a flow chart for explaining a meta-data registration process according to the fifth embodiment of the present invention.

FIG. 12 is a flow chart for explaining a meta-data registration process according to the fifth embodiment. Referring to FIG. 12, binary data designated by the user is loaded onto the memory (RAM 106) in step S3301. In this case, the binary data is designated by inputting a desired binary data file name at the keyboard, or indicating an icon of the corresponding binary data using the pointing device (e.g., a mouse). In step S3302, an XML file which is designated by the user and describes meta-data is loaded onto the memory (RAM 106). This XML file is also designated by inputting a file name at the keyboard or indicating the corresponding icon by the pointing device (e.g., a mouse).

It is checked in step S3303 if the XML file that describes meta-data is XML data in a correct format. The correct format is discriminated by checking if the description format of an XML file is satisfied (e.g., if the right and left parentheses of tags correctly form pairs, if a tag assignment format is correct, and so forth). Note that it is also checked if XML data is correct as well as if it has a correct format. Whether or not XML data is correct can be determined by checking, e.g., if XML data is described in accordance with a schema such as DTD (Document Type Definition) or the like.

If it is determined in step S3303 that the XML file is not XML data in the correct format, the flow advances to step S3305. In step S3305, an XML data error is displayed on the display 103, thus ending this process.

On the other hand, if it is determined in step S3303 that the XML file is XML data in the correct format, the flow advances to step S3304. In step S3304, the size of the meta-data of interest (XML data in this embodiment) is computed. In step S3306, the meta-data loaded in step S3302 and the size information computed in step S3304 are connected and registered after the end of the binary data loaded in step S3301 via a predetermined marker code. Furthermore, the binary data obtained by registering the meta-data is output in step S3307, and data having a data structure (to be described below with reference to FIG. 13) is stored as one file in the storage unit 102.

The method of registering meta-data in binary data according to the fifth embodiment will be explained below.

Figure 13:
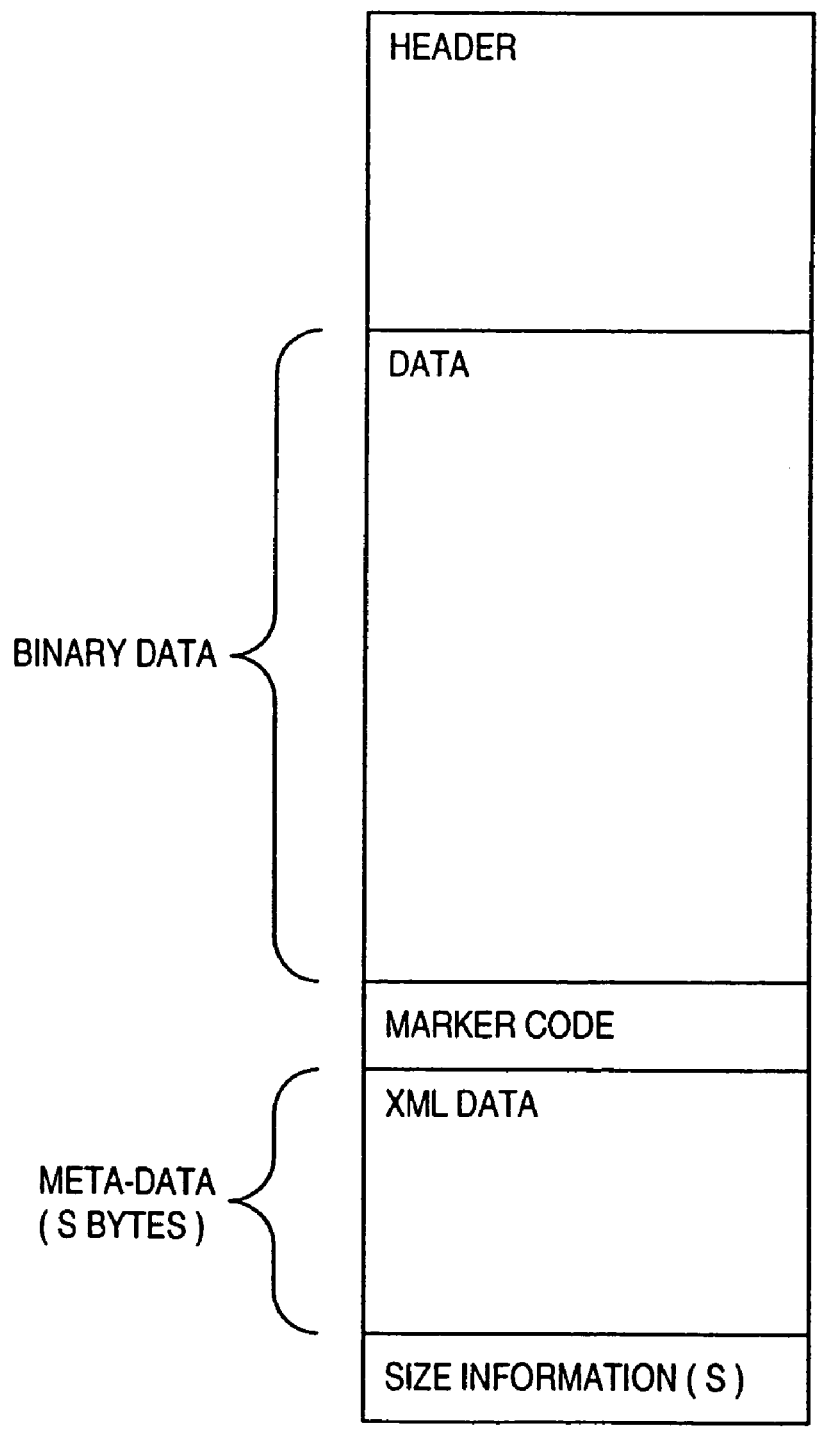
FIG. 13 is a view for explaining the registered state of meta-data in binary data according to the fifth embodiment.

FIG. 13 is a view for explaining the registered state of meta-data in binary data according to the fifth embodiment. In the fifth embodiment, as shown in FIG. 13, a predetermined 4-byte marker code (0x4C4D5850 in this embodiment) is connected to the end of binary data, meta-data described in XML is connected thereafter, and 4-byte numerical value data serving as size information is connected after that meta-data.

In this manner, meta-data can be registered without any influences on other applications. More specifically, assuming that binary data is standard JPEG image data, even when meta-data is appended to the end of that image data, an image can be loaded by a commercially available image application (that does not recognize meta-data) without posing any problems. That is, since information in the header field of binary data remains the same as that before connection of meta-data, if binary data is, e.g., image data, an image can be reproduced by a conventional browser (connected meta-data is ignored).

Furthermore, since meta-data is described in XML, if a tool that can interpret XML data is available, meta-data can be added, changed, and referred to, when the XML data contents are extracted, thus assuring very high compatibility. Note that extraction of XML data contents will be described in detail in the sixth embodiment.

As described above, according to the fifth embodiment, since predetermined data (marker) is appended to the head of meta-data (XML data) described in a correct format of a predetermined data description language, and data indicating the size of the meta-data is appended to the end of that meta-data, meta-data can be registered to existing binary data without any influences on existing applications. That is, binary data registered with meta-data can be provided in a format that can be processed by an existing application.

The presence/absence of meta-data can be discriminated more easily and quickly using the size information and marker appended to XML data, and meta-data can be extracted.

When an existing data description language is used as that for describing meta-data, existing tools of that data description language can be used upon edit, reference, and the like of meta-data, thus saving extra efforts for development.

Note that the correctness of XML data is checked in this embodiment, but whether or not data is well-formed may be checked instead. Also, the meta-data format is not limited to XML, and other formats such as SGML, HTML, and the like may be used. Also, the size information may be expressed by a little- or big-endian binary format or a text format.

Sixth Embodiment

In the fifth embodiment, the method of registering meta-data in binary data has been explained. In the sixth embodiment, a process for discriminating whether or not meta-data is registered to binary data, and extracting the meta-data if it is registered will be explained. Note that the arrangement of the data processing apparatus in the sixth embodiment is the same as that in the first embodiment (FIG. 1), and a detailed description thereof will be omitted.

The processes for discriminating whether or not meta-data that has been explained in the fifth embodiment is registered in data of a designated file, and extracting the registered meta-data will be explained below. The meta-data determination/extraction sequence of the sixth embodiment is the same as that shown in FIG. 4 in the second embodiment, and will be explained while applying FIG. 4. In this embodiment, the extracted meta-data is displayed on the display 103, but the present invention is not limited to such specific output mode. For example, it is known to those who are skilled in the art that the extracted meta-data may be provided to a search process.

Referring to FIG. 4, a file which is to undergo discrimination as to whether or not meta-data is registered (data to be processed) is designated by a user instruction in step S501. The file to be processed is designated in step S501 by inputting the file name of the binary data at the keyboard or indicating a corresponding icon using the pointing device (mouse).

Figure 14:
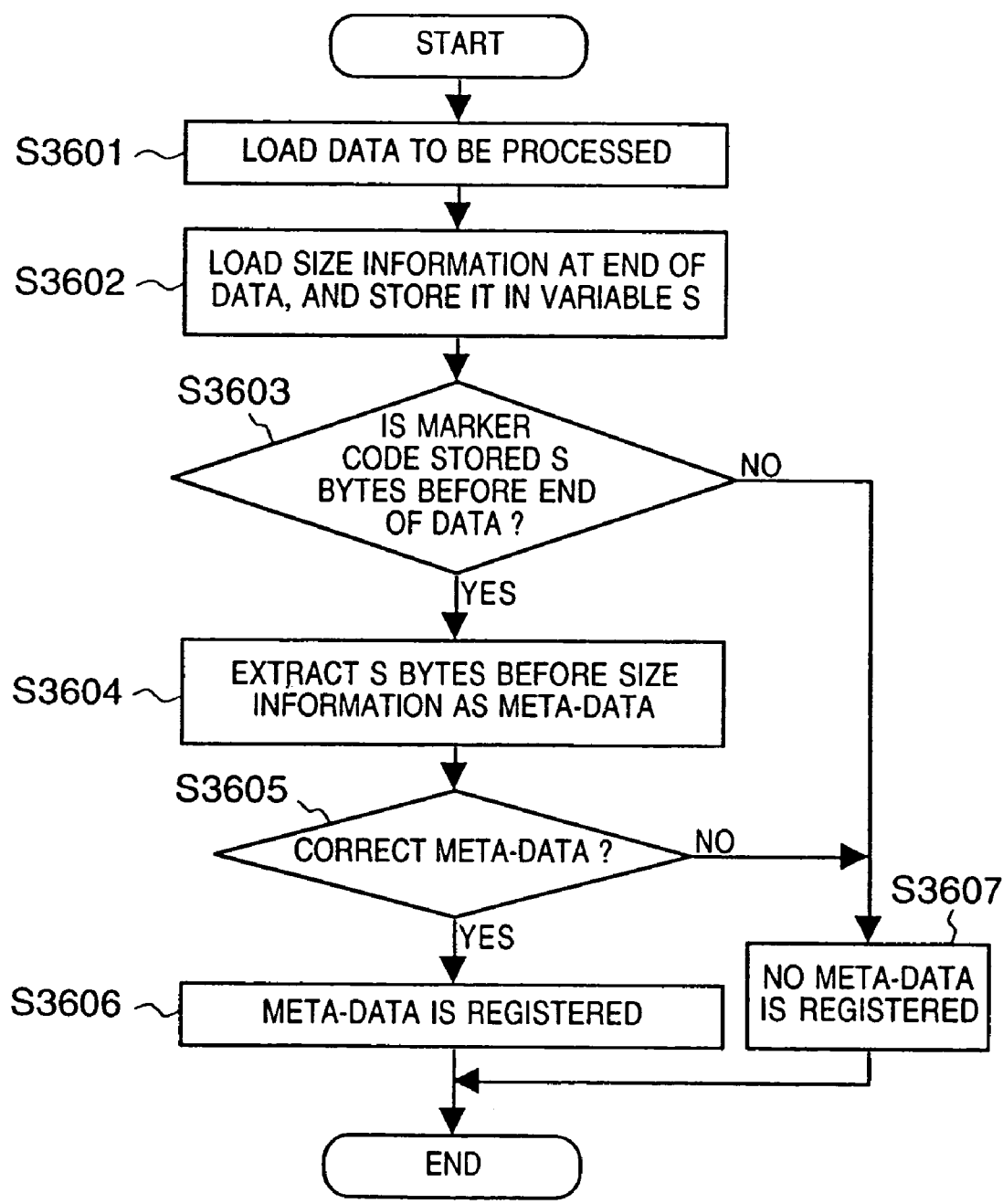
FIG. 14 is a flow chart for explaining details of a meta-data discrimination process according to the sixth embodiment of the present invention.
Figure 15:
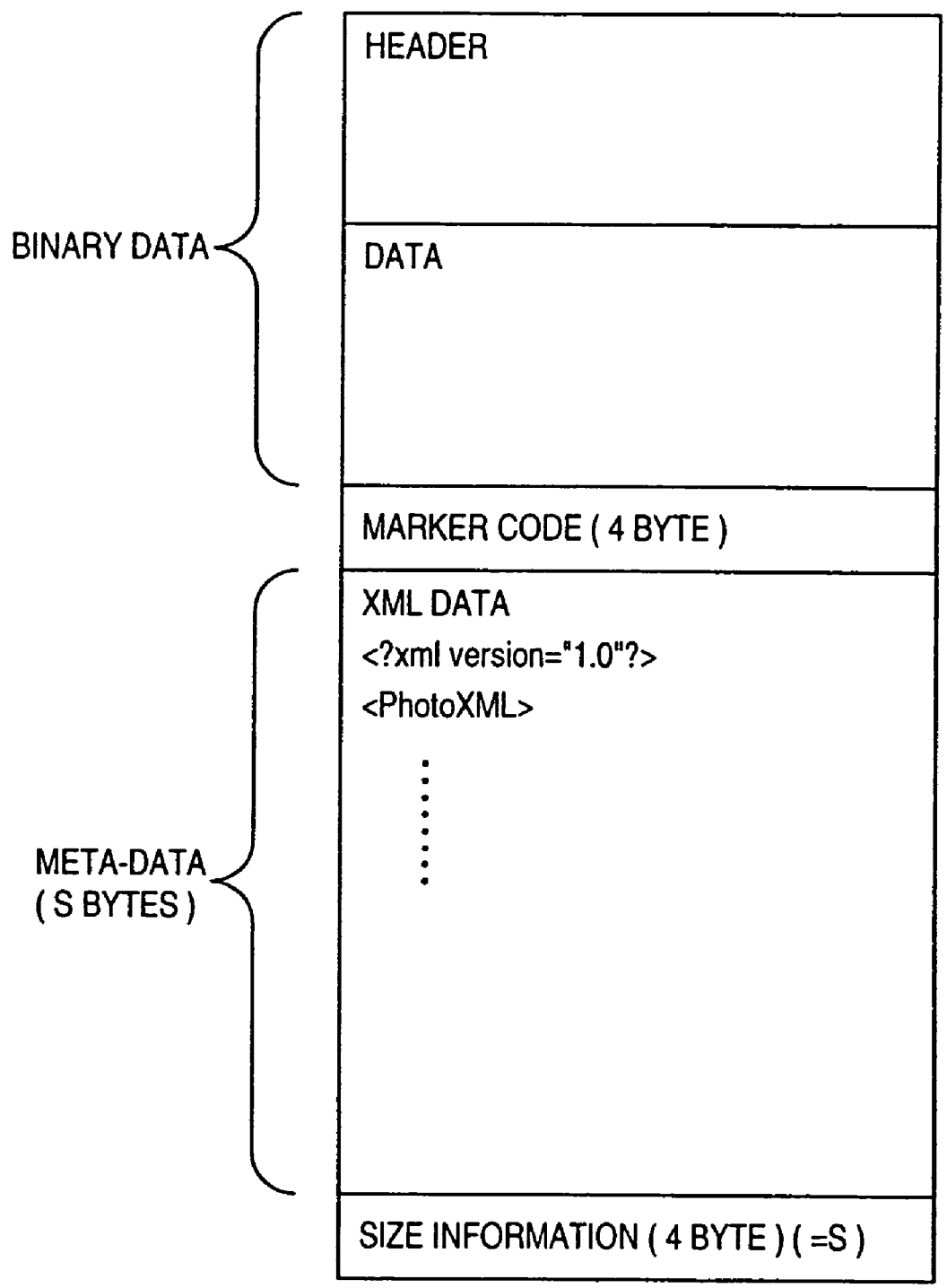
FIG. 15 shows an example of the data format of binary data in which XML data is registered as meta-data in the sixth embodiment.

It is discriminated in step S502 if meta-data described in XML is registered in data of the designated file. Details of the discrimination process in step S502 will be explained below with reference to the flow chart in FIG. 14 and a schematic view in FIG. 15. FIG. 14 is a flow chart for explaining details of the meta-data discrimination process according to the sixth embodiment. FIG. 15 shows an example of the data format of binary data in which XML data is registered as meta-data.

As has been explained in the fifth embodiment, the data format of the data to be processed in which XML data as meta-data is registered is as shown in FIG. 15. In this embodiment, assume that 4 bytes are assigned to each of size information and a marker code. The presence/absence of meta-data in such binary data is discriminated as follows.

As shown in FIG. 14, the entire data of the file designated in step S501 is loaded onto the memory (RAM 106) in step S3601. Since the data output in step S3307 in the fifth embodiment is managed as a single file, the entire data can be read out by a general file management system.

In step S3602, 4 bytes at the end of the loaded data to be processed are determined as size information of meta-data, and are stored in variable S. If meta-data is stored in the format shown in FIG. 15, a marker code should be stored in 4 bytes, which have a head position obtained by adding 8 (bytes) to variable S from the end of the data to be processed toward the head. Therefore, 4 bytes are read from the (S+8)-th byte from the end of the data to be processed, and are compared with a marker code (0x4C4D5850) in step S3603. If they are equal to each other, the flow advances to step S3604; otherwise, the flow advances to step S3607.

In step S3604, the presence of the marker code is determined, and S bytes are extracted from the (S+4)-th byte from the end of the data to be processed and are determined as meta-data. It is checked in step S3605 if the extracted meta-data follows the rules of the description language. For example, if meta-data is described in XML, correctness (or well-formedness) of its contents is checked. In this case, for example, the processes in steps S1602 and S1603 in the second embodiment or in steps S2602 and S2603 in the fourth embodiment can be applied. If the meta-data follows the rules, the flow advances to step S3606 to conclude that meta-data is registered.

On the other hand, if it is determined in step S3603 that 4-byte data read from the (S+8)-th byte from the end of the data to be processed is not equal to the marker code (0x4C4D5850), or if it is determined in step S3605 that the contents extracted as meta-data do not follow the rules of the description language, the flow advances to step S3607. In step S3607, it is concluded that no meta-data is registered.

In this manner, discrimination of meta-data ends.

Referring back to the flow chart in FIG. 4, if it is concluded by the process shown in the flow chart in FIG. 14 that meta-data is registered, the flow advances to step S503. In step S503, the contents of the registered meta-data are displayed on the basis of the S-byte data (in this embodiment, data described in XML) extracted in step S3604, thus ending the process. On the other hand, if it is determined in step S502 that no meta-data is registered, the process ends.

As described above, according to the sixth embodiment, data is extracted from the data to be processed on the basis of the size indicated by data stored at the end of the data to be processed, and the presence/absence of meta-data is determined by checking if the extracted data is described in a correct format of the description language (e.g., XML). For this reason, meta-data can be discriminated and extracted more easily.

If the presence of meta-data is determined, that meta-data can be displayed.

According to the sixth embodiment, binary data registered with meta-data can be discriminated from that registered with no meta-data, and the registered meta-data can be extracted. Therefore, when an existing data description language is used as that for describing meta-data, existing tools of that data description language can be used in a search process using meta-data, thus saving extra efforts for development.

In each of the above embodiments, XML data is used as meta-data. However, the present invention is not limited to such specific data. For example, other data description languages such as SGML, HTML, and the like may be used. Also, still image data, moving image data, audio data, and the like can be used as binary data.

The fifth embodiment inserts a marker code indicating the position of meta-data immediately before meta-data, and the sixth embodiment extracts meta-data using that marker code. However, the marker code is not always required, but may be omitted. If no marker code is inserted, marker code discrimination in step S3603 can be merely skipped in the sixth embodiment, thus obtaining the same discrimination result. However, in such case, the load on the discrimination routine which determines if no meta-data is present increases.

Seventh Embodiment

Each of the first to sixth embodiments described above allows to append meta-data to binary data without any influences on existing applications. In the seventh embodiment, a case will be described below wherein still image data is used as binary data, and data representing area information of the still image data is used as meta-data.

Note that the arrangement of the data processing apparatus in the seventh embodiment is the same as that in the first embodiment (FIG. 1), and a detailed description thereof will be omitted. The storage unit 102 especially stores still image data and area information.

Figure 16:
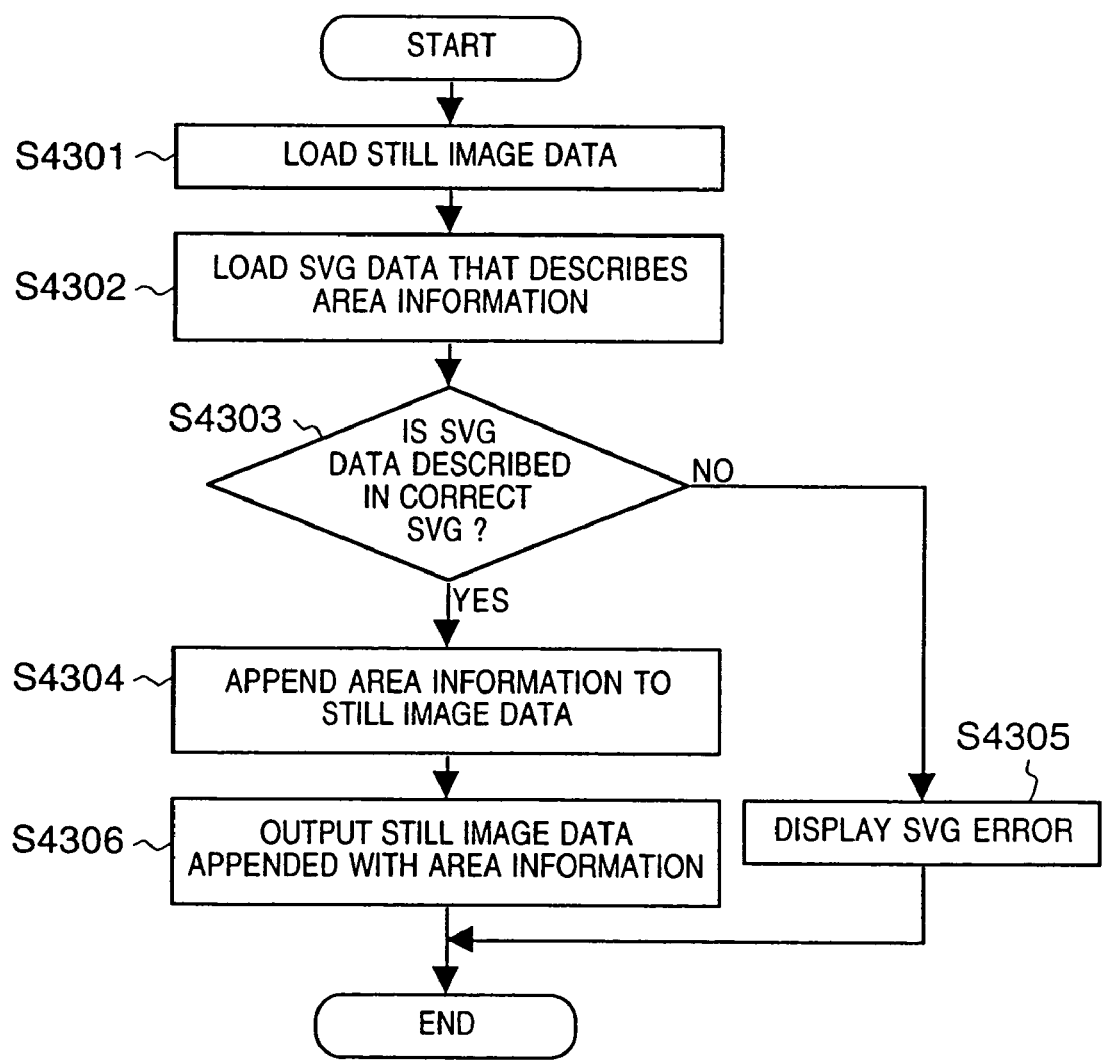
FIG. 16 is a flow chart for explaining an appending process of area information according to the seventh embodiment of the present invention.

FIG. 16 is a flow chart for explaining a process for appending area information according to the seventh embodiment.

Referring to FIG. 16, still image data designated by the user is loaded onto the memory (RAM 106) in step S4301. For example, the still image data is designated by inputting a desired still image data file name at the keyboard, or indicating an icon of the corresponding still image data using the pointing device (e.g., a mouse). In step S4302, an SVG file which is designated by the user and describes area information is loaded onto the memory (RAM 106). This SVG file is also designated by inputting a file name at the keyboard or indicating the corresponding icon by the pointing device (e.g., a mouse).

It is checked in step S4303 if the SVG file that describes area information is correct SVG data. The correct format is discriminated by checking if the description format of an SVG file is satisfied (e.g., if the right and left parentheses of tags correctly form pairs, if a tag assignment format is correct, and so forth).

If it is determined in step S4303 that the SVG file is not correct SVG data, the flow advances to step S4305. In step S4305, an SVG data error is displayed on the display 103, thus ending this process.

On the other hand, if it is determined in step S4303 that the SVG file is correct SVG data, the flow advances to step S4304. In step S4304, area information is appended by connecting data in that SVG file (area information) to the end of the still image data loaded onto the memory in step S4301. After that, the still image data registered with the area information is output in step S4306, thus ending the process. Note that data having a data structure shown in FIG. 17 is stored as one file in the storage unit 102 upon outputting data in step S4306.

Figure 17:
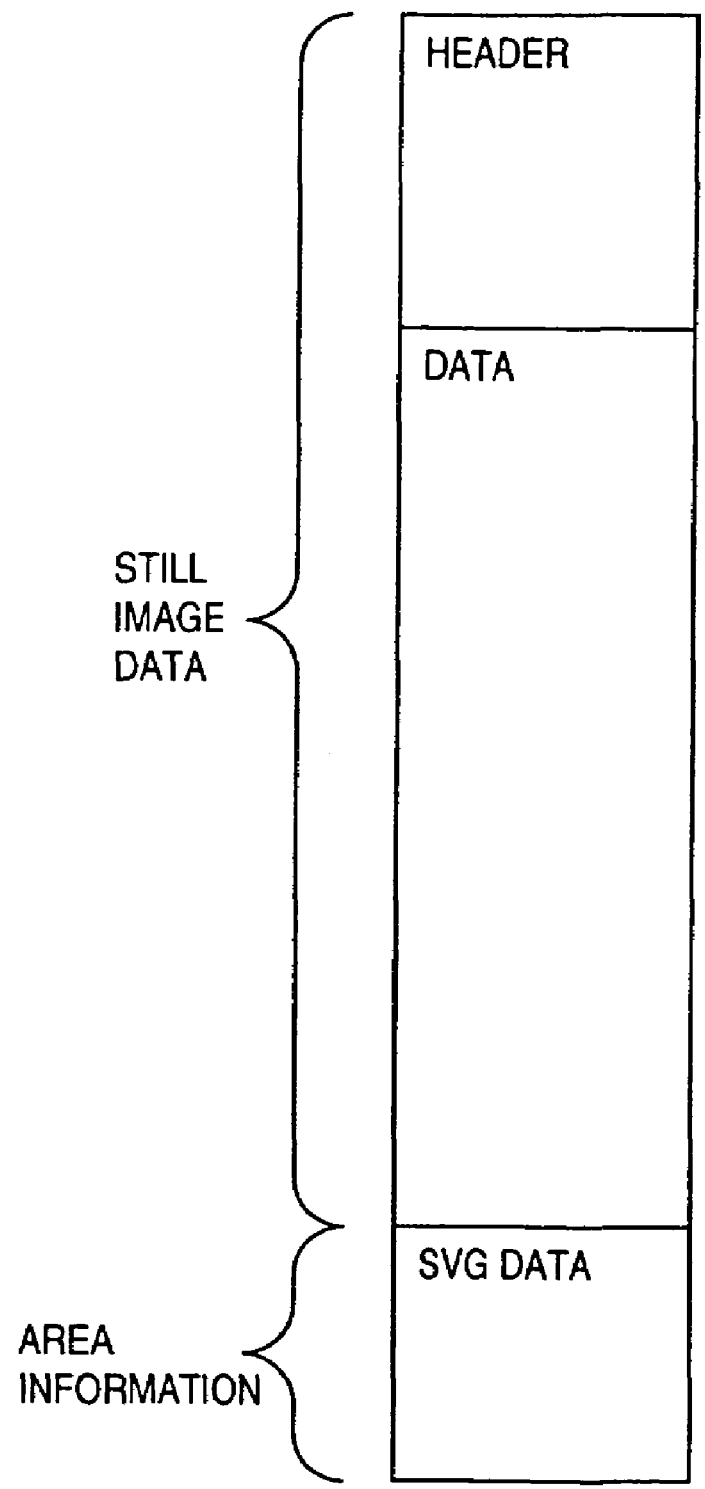
FIG. 17 is a view for explaining the registered state of area information in still image data according to the seventh embodiment.

FIG. 17 is a view for explaining the registration state of area information in still image data according to this embodiment. As shown in FIG. 17, by connecting SVG data serving as area information to the end of still image data, area information can be registered without any influences on other applications. More specifically, since information in the header field of still image data remains the same as that before connection of area information, an image can be reproduced by a conventional browser (connected area information is ignored).

Furthermore, since area information is SVG data, if a tool that can interpret SVG data is available, area information can be added, changed, and referred to, when the SVG data contents are extracted, thus assuring very high compatibility. Note that extraction of SVG data contents will be described in detail in the eighth embodiment.

As described above, according to the seventh embodiment, when area information which is described in a correct format of a predetermined data description language is connected to the end of still image data, area information can be appended to existing still image data. That is, still image data appended with area information can be provided in a format that can be processed by an existing application. Since the area information and still image data can be managed as a single file, management of area information is facilitated. When an existing data description language is used as that for describing area information, existing tools of that data description language can be used upon edit, reference, and the like of area information, thus saving extra efforts for development.

Note that the format of the still image data is not particularly limited (e.g., JPEG, GIF, and the like may be used).

Eighth Embodiment

In the seventh embodiment, the method of registering area information in still image data has been explained. In the eighth embodiment, a process for discriminating whether or not area information is registered in still image data, and extracting the area information if it is registered will be explained. Note that the arrangement of the data processing apparatus in the eighth embodiment is the same as that in the first embodiment (FIG. 1), and a detailed description thereof will be omitted.

Figure 18:
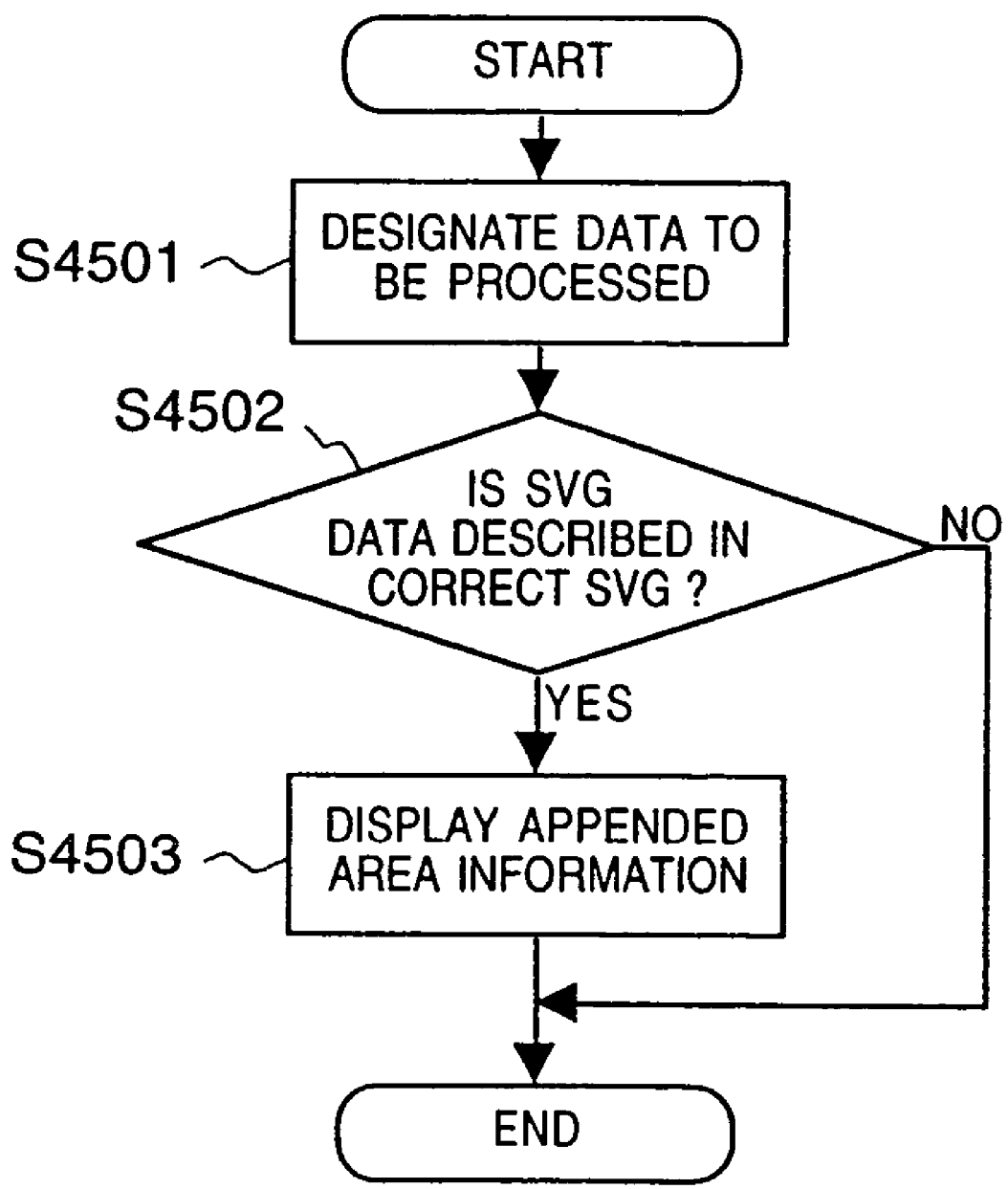
FIG. 18 is a flow chart showing the discrimination/ extraction sequence of the registered area information according to the eighth embodiment of the present invention.

The processes for discriminating whether or not area information that has been explained in the seventh embodiment is registered in data of a designated file, and extracting the registered area information will be explained below. FIG. 18 is a flow chart showing the discrimination/extraction sequence of registered area information according to the eighth embodiment. In this embodiment, the extracted area information is displayed on the display 103, but the present invention is not limited to such specific output mode. For example, it is known to those who are skilled in the art that the extracted area information may be provided to various other processes such as recognition of objects in an image.

Referring to FIG. 18, a file which is to undergo discrimination as to whether or not area information is registered, i.e., data to be processed, is designated by a user instruction in step S4501. The data to be processed is designated in step S4501 by inputting the file name of the still image data at the keyboard or indicating a corresponding icon using the pointing device (mouse). In this embodiment, in order to discriminate normal still image data from still image data appended with area information that has been explained in the seventh embodiment, the former will be referred to as still image data, and the latter will be referred to as data to be processed.

Figure 19:
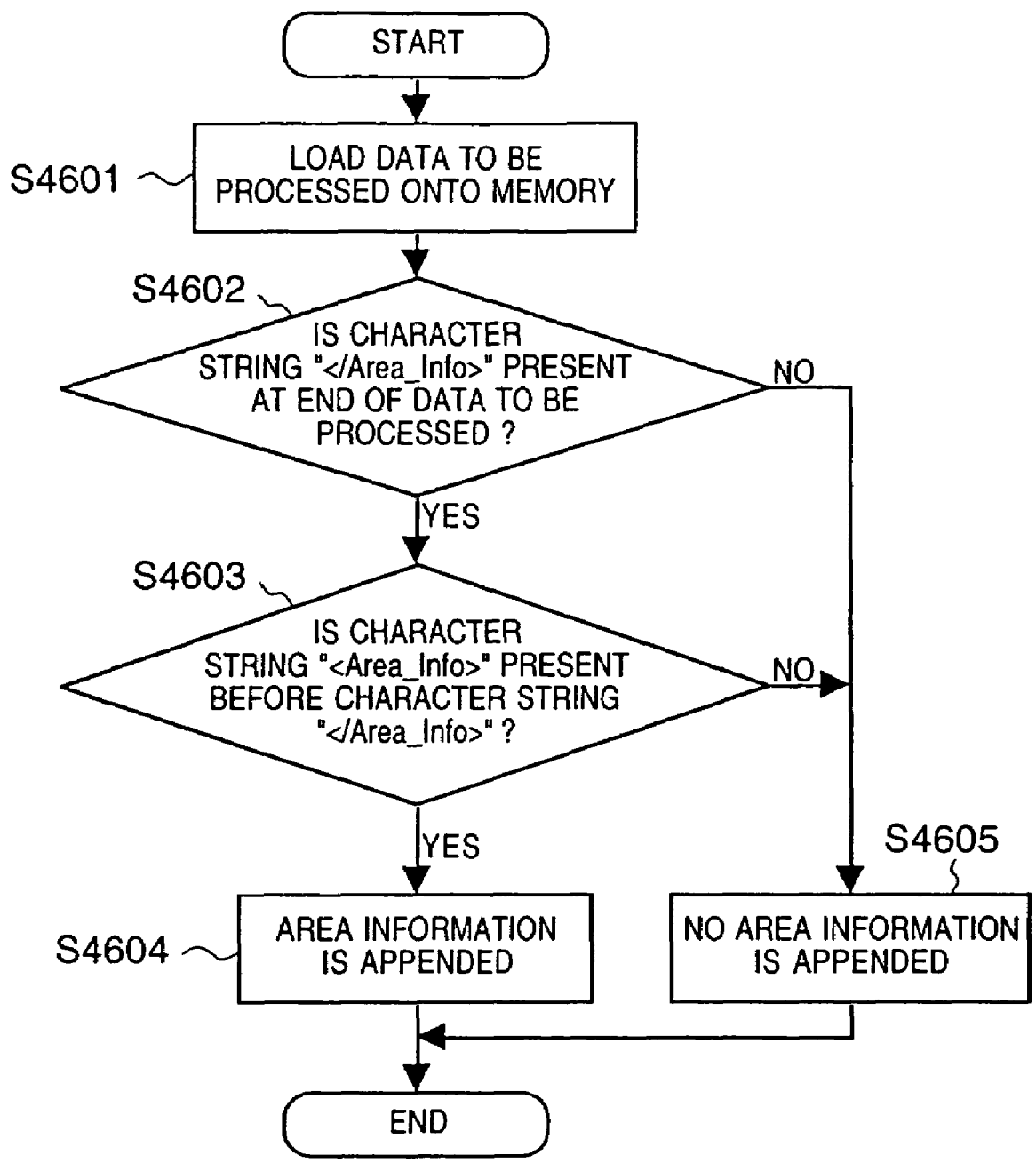
FIG. 19 is a flow chart for explaining details of an area information discrimination process according to the eighth embodiment.
Figure 20:
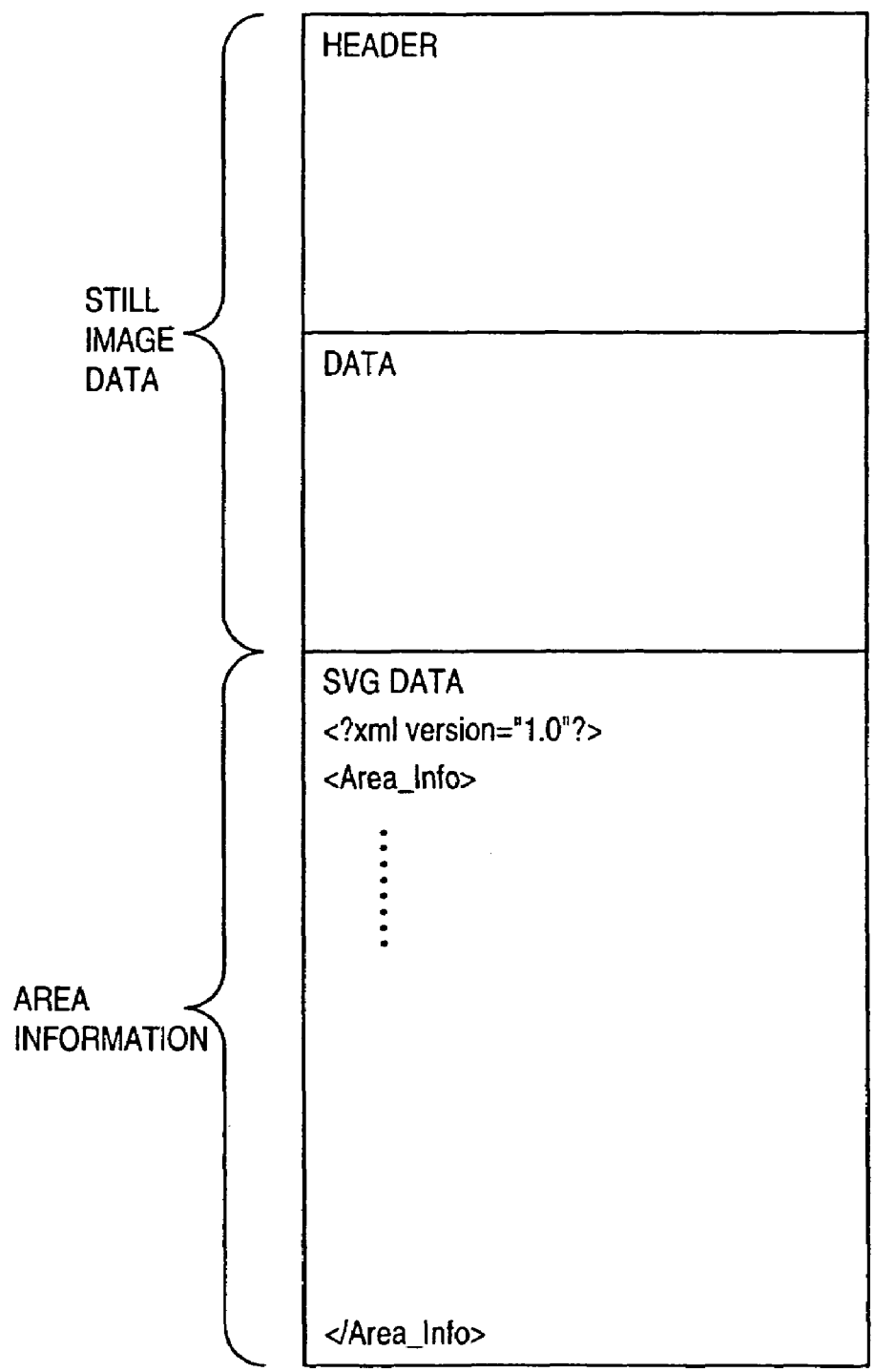
FIG. 20 shows an example of the data format of still image data in which SVG data is appended as area information in the sixth embodiment.

It is discriminated in step S4502 if area information described in SVG is appended to data of the designated file. Details of the discrimination process in step S4502 will be explained below with reference to the flow chart in FIG. 19 and a schematic view in FIG. 20. FIG. 19 is a flow chart for explaining details of the area information discrimination process according to the eighth embodiment. FIG. 20 shows an example of the data format of still image data to which SVG data is appended as area information.

As has been explained in the seventh embodiment, the data format of the data to be processed in which SVG data as area information is registered is as shown in FIG. 20. Hence, the presence/absence of area information is discriminated as follows.

As shown in FIG. 19, the entire data of the file designated in step S4501 (the entire data to be processed) is loaded onto the memory (RAM 106) in step S4601. Since the data output in step S4306 in the seventh embodiment is managed as a single file, the entire data can be read out by a general file management system.

It is checked in step S4602 if a character string "</Area_Info>" is present at the end of data loaded in step S4601. If such character string is not present, the flow advances to step S4605.

On the other hand, if the character string "</Area_Info>" is present at the end of the loaded data to be processed, the flow advances to step S4603. It is checked in step S4603 if a character string "<Area_Info>" is present before the character string "</Area_Info>". In this manner, it is checked if data bounded by the character strings "<Area_Info>" and "</Area_Info>", i.e., SVG data, is present. Furthermore, it is discriminated by checking pairing of tags if the data bounded by "<Area_Info>" and "</Area_Info>" is correct SVG data.

In this way, it is checked if the SVG data is present at the end of the data to be processed, and is correct. If the presence and correctness of the SVG data are confirmed, the flow advances to step S4604. It is concluded in step S4604 that area information is appended (correct SVG data is present), and this process ends. On the other hand, if it is determined in step S4602 or S4603 that no SVG data is present or SVG data is incorrect, the flow advances to step S4605. It is concluded in step S4605 that area information is not appended (no correct SVG data is present).

In this manner, discrimination of area information ends.

Referring back to the flow chart in FIG. 18, if it is concluded by the process shown in the flow chart in FIG. 19 that area information is registered, the flow advances to step S4503. In step S4503, the contents of the registered area information are displayed on the basis of SVG data bounded by the character strings "<Area_Info>" and "</Area_Info>", thus ending the process. On the other hand, if it is determined in step S4502 that no area information is registered, the process ends.

As described above, according to the eighth embodiment, still image data with area information, and normal still image data can be discriminated from each other based on SVG rules, and as for the still image data appended with the area information, its area information can be used. In this embodiment, contents based on SVG data are displayed, but SVG data may be used for various other purposes. For example, when an image is clicked, an area including the clicked point may be clipped. Also, SVG data may be used as a kind of meta-data upon searching for an area having a specific shape or color.

Since SVG data described in the existing data description language is used as area information, existing tools of that data description language can be used in a search process using meta-data, thus saving extra efforts for development.

In the above embodiment, SVG data is used to describe area information, but the present invention is not limited to such specific data type. For example, data description languages such as XML, SGML, HTML, and the like may be used.

In the seventh and eighth embodiments, SVG data as meta-data is appended to the end of still image data as binary data. However, as described in the third to sixth embodiments, a check sum of SVG data, or a marker code and size information of SVG data may be registered, and reliability upon discriminating the presence/absence of SVG data may be improved using such information.

Ninth Embodiment

The format of area information to be appended to still image data will be explained below. The ninth embodiment will exemplify the data format of area information to be appended to still image data, in which each area is expressed by index information indicating an area number. That is, the index information represents a unique area number assigned to each of areas obtained by area segmentation. Based on this index information, area information is formed by storing area numbers in correspondence with pixels of a still images.

Note that area information corresponding to each pixel is stored in the same manner as color information of a pixel in still image data. That is, color information corresponding to each pixel is replaced by area information in the data format. After that, tags (e.g., "<Area_Info>" and "</Area_Info>") indicating the start and end of area information are attached before and after the obtained area information.

Figure 23:
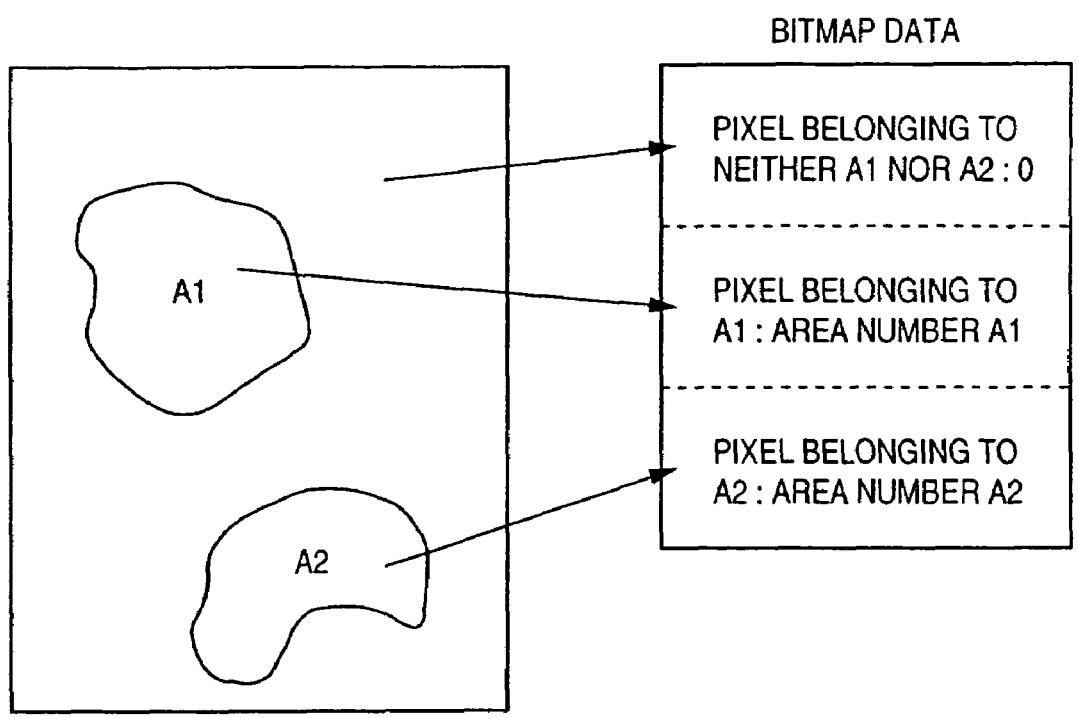
FIG. 23 is a view for explaining a data format of area information according to the ninth embodiment of the present invention.
Figure 24:
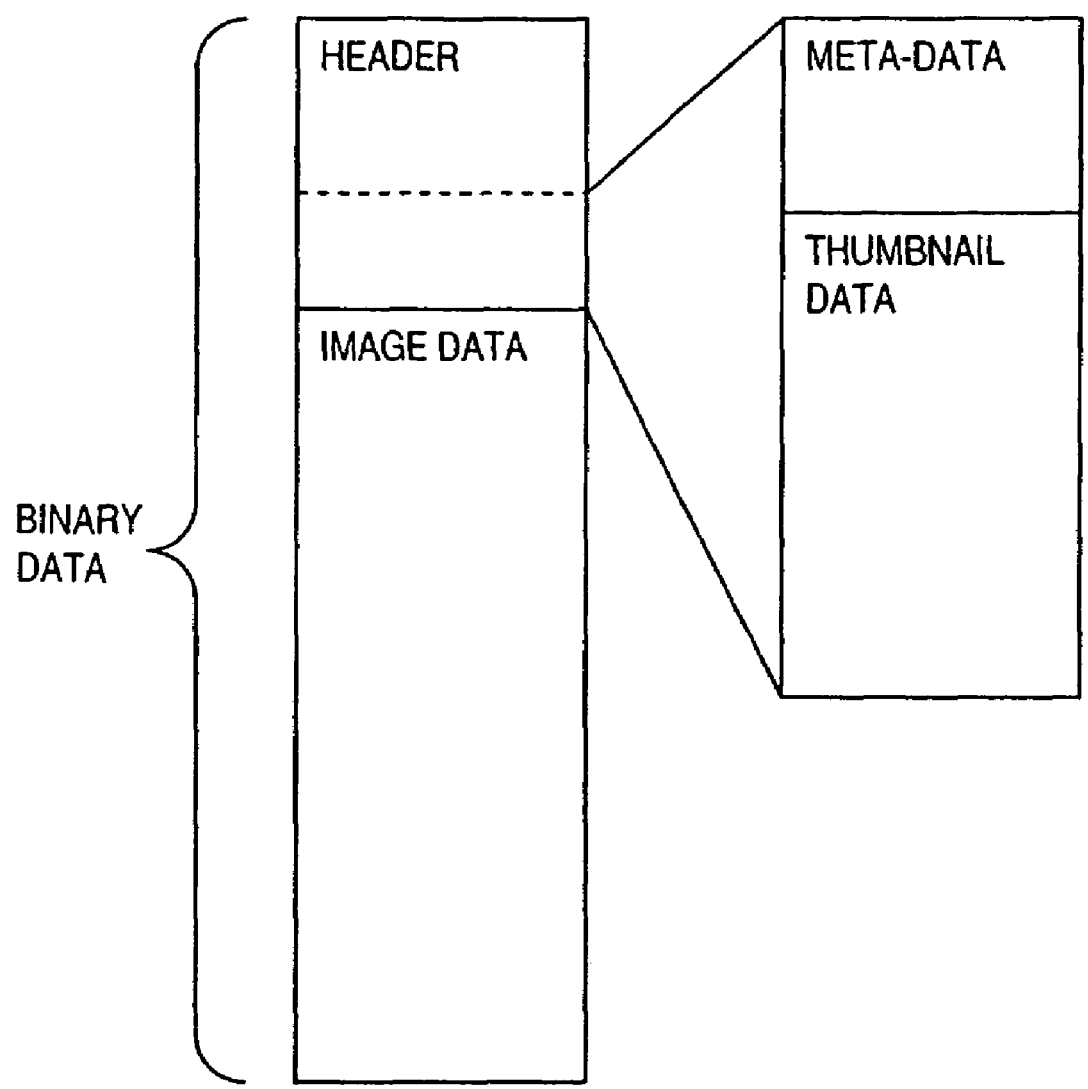
FIG. 24 shows the concept of a data format in which meta-data is embedded in binary data by a general method.
Figure 25:
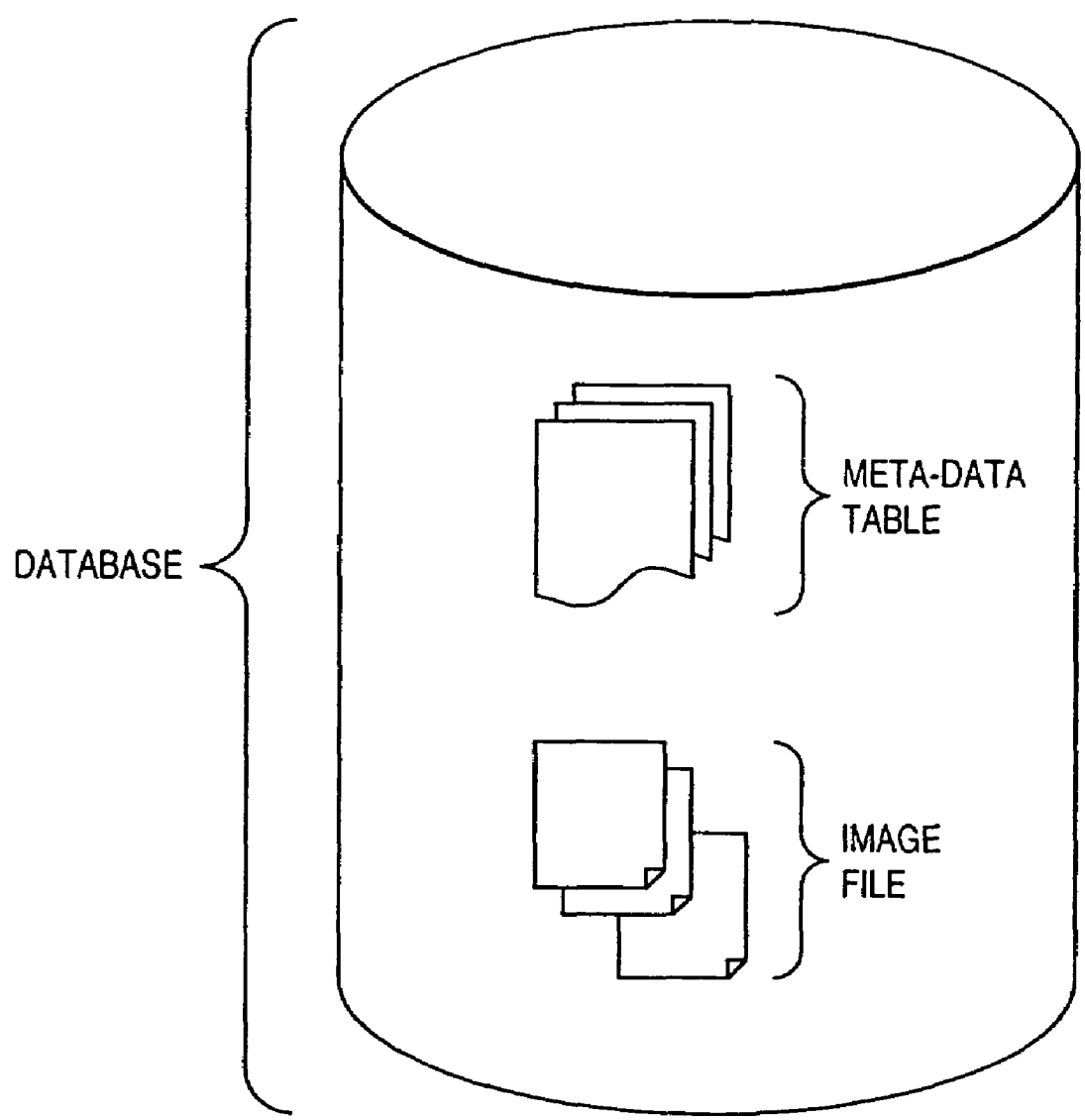
FIG. 25 shows the concept of a general method of managing binary data and meta-data using a database.
Figure 26:
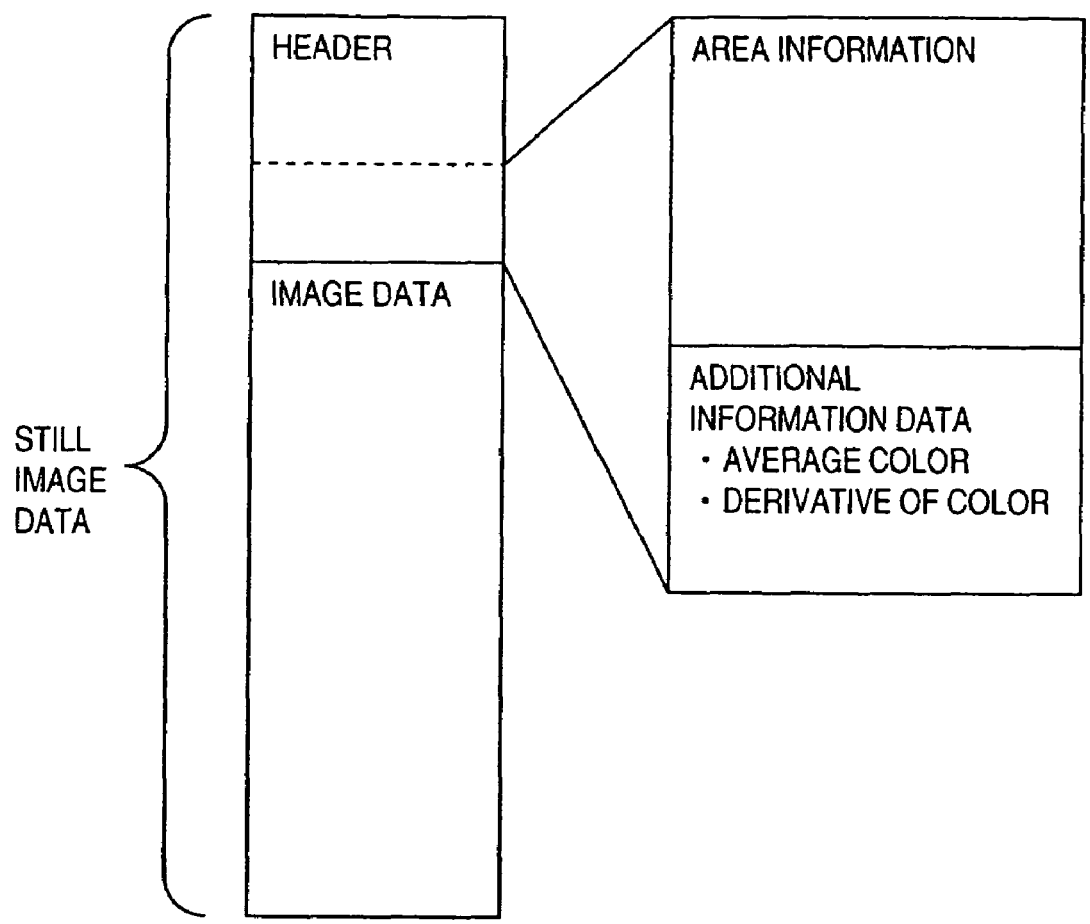
FIG. 26 shows the concept of a format in which area information as meta-data is embedded in still image data as binary data.
Figure 27:
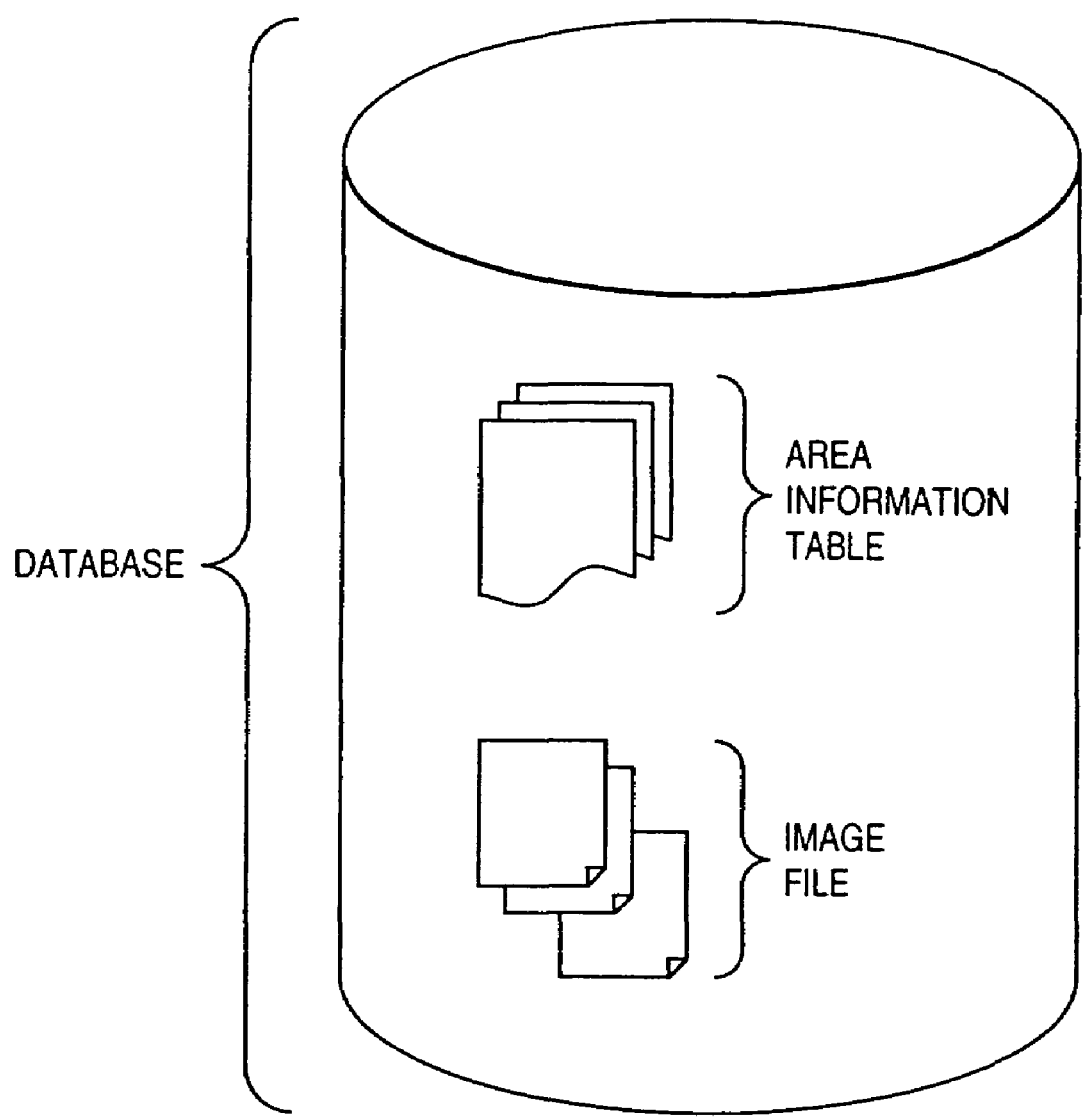
FIG. 27 shows the concept of a method of managing still image data and area information using a database.

FIG. 23 is a view for explaining the data format of area information according to the ninth embodiment. In FIG. 23, areas A1 and A2 are extracted as area segmentation results. In such case, the following bitmap data can be used as area information. More specifically, a numerical value indicating the absence of area numbers ("0" in this embodiment) is assigned to pixel data corresponding to an area other than areas A1 and A2. Area numbers indicating A1 and A2 are respectively assigned to pixel data that belong to areas A1 and A2. Note that each area may be approximated by a rectangle, polygon, circle, oval, or the like. In this manner, by holding area numbers as bitmap data, the area number of an arbitrary pixel can be obtained. For this reason, when an arbitrary area of an image is clicked, all pixels having the same area number as that of the pixel indicated by the mouse pointer can be selected. Using such feature, a function of clipping an arbitrary area can be implemented.

10th Embodiment

In the 10th embodiment, another embodiment of the data format of area information will be explained. In a method of appending area information to still image data in the 10th embodiment, each area is expressed by a set of binary bitmap data indicating the interior/exterior of an area bounded by a minimum rectangle, and data indicating the position and size of the rectangle.

Figure 21:
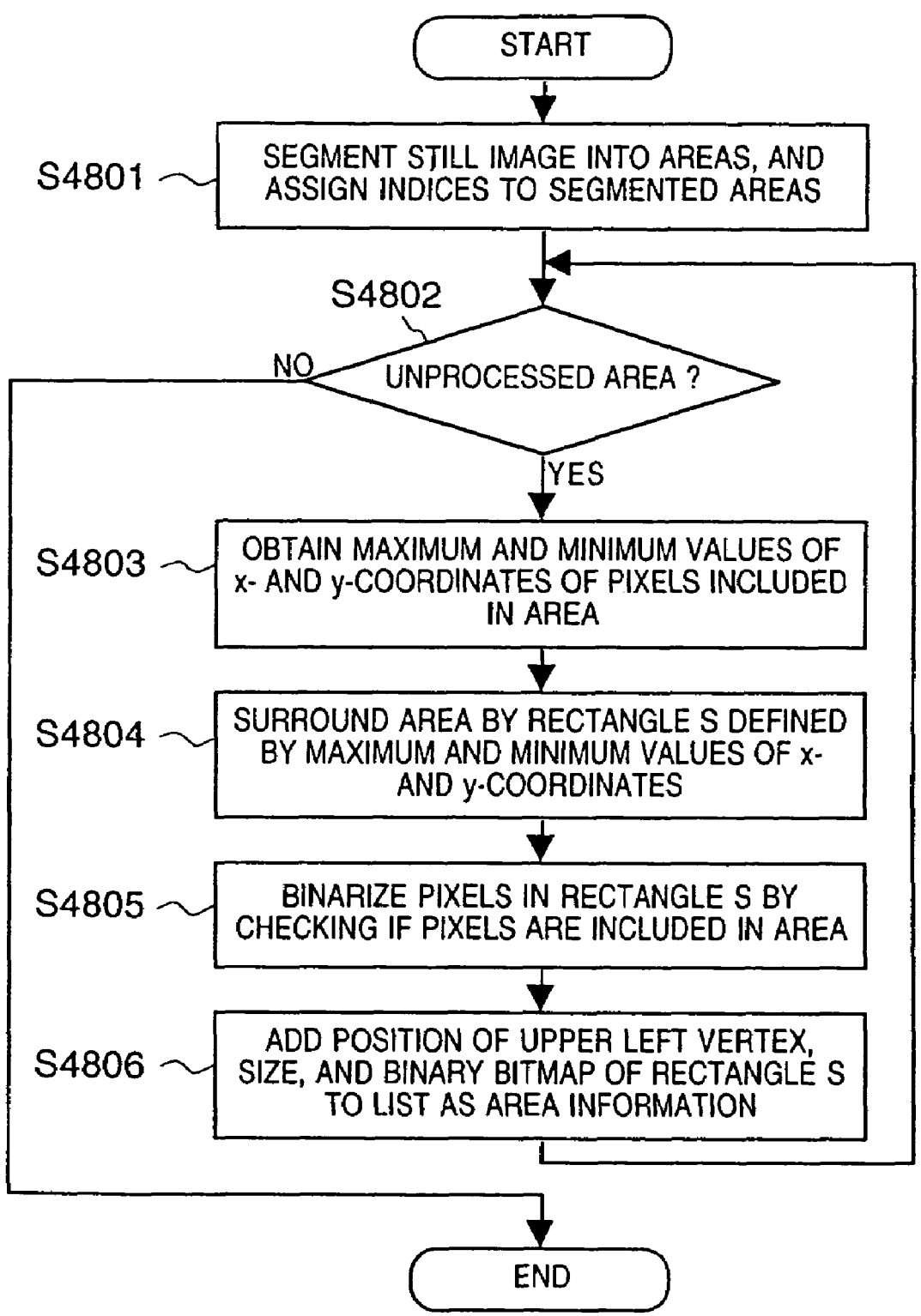
FIG. 21 is a flow chart for explaining a process for generating area information in a data format according to the 10th embodiment of the present invention.
Figures 22A, 22B:
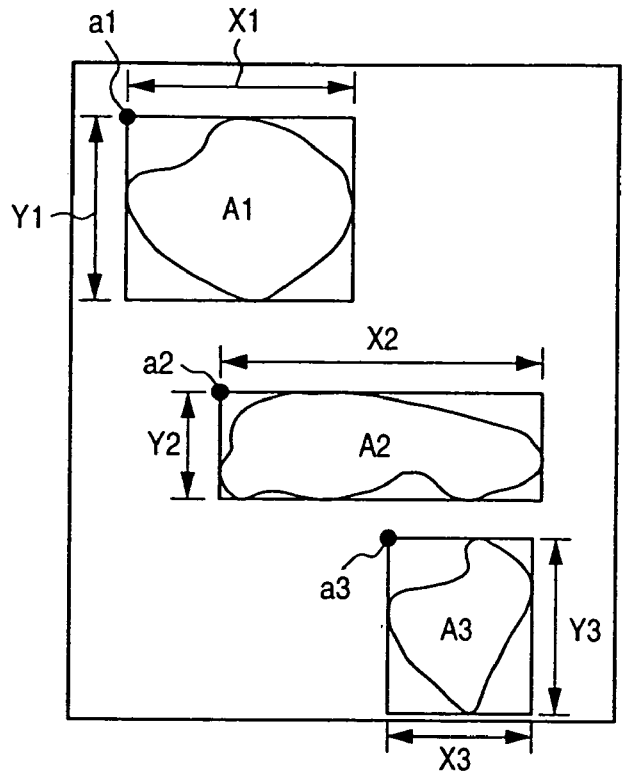
FIG. 22A shows an example of an image segmented into areas.
FIG. 22B is a table showing an example of the data format of an area information list according to the 10th embodiment, which corresponds to the segmented areas shown in FIG. 22A.

FIG. 21 is a flow chart for explaining the process for generating area information in the data format according to the 10th embodiment. FIG. 22A shows an image segmented into areas, and FIG. 22B shows an example of the data format of an area information list of the 10th embodiment, which corresponds to the segmented areas shown in FIG. 22A. The following explanation will be given with reference to these figures.

In step S4801, a still image undergoes area segmentation, and unique area numbers are assigned as indices to respective areas. Note that area segmentation may be done either automatically or manually. FIG. 22A shows a state wherein three areas are extracted as area segmentation results, and area numbers (indices) A1 to A3 are assigned to these areas.

It is checked in step S4802 if areas that have not undergone processes in steps S4803 to S4806 remain, and if unprocessed areas are found, the flow advances to step S4803. The processes in steps S4803 to S4806 obtain binary bitmap data, position, and size of the area of interest.

In step S4803, the maximum and minimum values of x- and y-coordinates of the area of interest are obtained. In step S4804, a rectangle S which has the coordinates obtained in step S4803 as its four corners is formed to bound the area of interest. In step S4805, binary bitmap data is obtained by binarization, i.e., checking if pixels are included in the area bounded by the rectangle S in step S4804.

In step S4806, the coordinate position (rectangle position) of the upper left vertex, and the x- and y-sizes (rectangle size) of the rectangle S are computed from the coordinates of the four corners of the rectangle S, and the obtained rectangle information, rectangle size, and binary bitmap data are added to an area information list as area information.

For example, if the area of interest is A1, a rectangle that circumscribes area A1 is obtained in steps S4803 and S4804. In step S4805, binary bitmap data is generated by setting "1" in bits indicating pixels included in the rectangle, and "0" in bits indicating pixels outside the rectangle. Furthermore, in step S4806 the position of the rectangle (the coordinates of a1) and size (X1 and Y1) are obtained, and are added to the area information list together with the aforementioned binary bitmap data, as shown in FIG. 22B.

Such processes are repeated for areas A2 and A3, and if it is determined in step S4802 that the processes are completed for all the areas in the image, this process ends.

In the aforementioned sequence, information including a set of binary bitmap data indicating the interior/exterior of a minimum rectangular region that bounds each segmented area, and data indicating the position and size of the rectangle is generated, and is stored in the form of list shown in FIG. 22B, thus generating an area list. By attaching tags (e.g., "<Area_Info>" and "</Area_Info>") to the start and end of the area list, area information that can be used in the above embodiments is generated. In this manner, in the 10th embodiment, bitmap data indicating the interior/exterior of the area is held. For this reason, upon executing processes in units of areas, when data is stored in the format of the ninth embodiment, a set of pixels that form an area must be acquired by scanning an image. However, when the bitmap data indicating the interior/exterior of the area of the 10th embodiment is used, a need for the process for acquiring a set of pixels that form the area by scanning an image can be obviated.

In the 10th embodiment, a rectangle that bounds an area is used, but an area may be expressed by other polygons or curves.

As described above, according to the present invention, meta-data can be registered to existing binary data without any influence on existing applications. That is, binary data registered with meta-data can be provided in a format that can be processed by an existing application.

Also, according to the present invention, when a data description language is used to describe meta-data, tools for the existing data description language can be used, and a compatible application can be easily developed.

Furthermore, according to the present invention, meta-data can be extracted from binary data in which meta-data is described, and can be used in processes such as search, reference, change, and the like.

Moreover, according to the present invention, confirmation information such as a check sum is registered together with meta-data, and the presence/absence of meta-data is discriminated using this confirmation information, thus allowing more accurate discrimination of meta-data.

In addition, according to the present invention, since the size of meta-data is registered to binary data together with meta-data, binary data in which meta-data is described can be easily discriminated.

Furthermore, according to the present invention, area information can be appended to still image data without any influences on existing applications.

Moreover, according to the present invention, still image data registered with area information can be provided in a format that can be processed by an existing application.

In addition, according to the present invention, since a general data description language is used to describe the area information, existing tools for that data description language can be used, and a compatible application can be easily developed.

Also, according to the present invention, area information can be easily extracted from still image data in which area information is described, and can be used in various processes.

Furthermore, the present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the claims.

What is claimed is:

1. A data processing method for registering meta-data to content of data, comprising:
 a first loading step of loading content of data to which meta-data is to be appended;
 a second loading step of loading meta-data to be appended to the content of data;

a connection step of connecting the meta-data loaded in the second loading step after the content of data loaded in the first loading step; and an output step of outputting data obtained in the connection step as a single file.

2. The method according to claim 1, wherein the content of data has a header portion and a binary data portion, and the meta-data follows the binary data portion in the connection step.

3. The method according to claim 1, further comprising a generation step of generating confirmation information on the basis of the meta-data loaded in the second loading step, and wherein the connection step includes a step of connecting the confirmation information generated in the generation step and the meta-data loaded in the second loading step after the content of data loaded in the first loading step.

4. The method according to claim 1, further comprising a generation step of generating size information indicating a size of the meta-data loaded in the second loading step, and wherein the connection step includes a step of connecting the meta-data loaded in the second loading step after the content of data loaded in the first loading step, and then connecting the size information generated in the generation step after the meta-data.

5. The method according to claim 1, wherein the content of data includes image data, and the meta-data represents area information that pertains to the image data.

6. The method according to claim 1, wherein the content of data is one of image data, audio data, and moving image data.

7. A data processing apparatus for registering meta-data to content of data, comprising:

a first loading device adapted to load content of data to which meta-data is to be appended;

a second loading device adapted to load meta-data to be appended to the content of data;

a connection device adapted to connect the meta-data loaded by the second loading device after the content of data loaded by the first loading device; and an output device adapted to output data obtained by the connection device as a single file.

8. The apparatus according to claim 7, wherein the content of data has a header portion and a binary data portion, and the meta-data follows the binary data portion by the connection device.

9. The apparatus according to claim 7, further comprising a generation device adapted to generate confirmation information on the basis of the meta-data loaded by the second loading device, and wherein the connection device connects the confirmation information generated by the generation device and the meta-data loaded by the second loading device after the content of data loaded by the first loading device.

10. The apparatus according to claim 7, further comprising a generation device adapted to generate size information indicating a size of the meta-data loaded by the second loading device, and wherein the connection device connects the meta-data loaded by the second loading device after the content of data loaded by the first loading device, and then connects the size information generated by the generation device after the meta-data.

11. The apparatus according to claim 7, wherein the content of data includes image data, and the meta-data represents area information that pertains to the image data.

12. The apparatus according to claim 7, wherein the content of data is one of image data, audio data, and moving image data.

13. A computer readable storage medium on which is stored a control program for making a computer implement a data process for registering meta-data to content of data, said data process comprising:

a first loading step of loading content of data to which meta-data is to be appended;

a second loading step of loading meta-data to be appended to the content of data;

a connection step of connecting the meta-data loaded in the second loading step after the content of data loaded in the first loading step; and an output step of outputting data obtained in the connection step as a single file.

14. The computer readable storage medium according to claim 13, wherein the content of data has a header portion and a binary data portion, and the meta-data follows the binary data portion in the connection step.

15. The computer readable storage medium according to claim 13, wherein said data process further comprises a generation step of generating confirmation information on the basis of the meta-data loaded in the second loading step, and wherein the connection step includes a step of connecting the confirmation information generated in the generation step and the meta-data loaded in the second loading step after the content of data loaded in the first loading step.

16. The computer readable storage medium according to claim 13, wherein said data process further comprises a generation step of generating size information indicating a size of the meta-data loaded in the second loading step, and wherein the connection step includes a step of connecting the meta-data loaded in the second loading step after the content of data loaded in the first loading step, and then connecting the size information generated in the generation step after the meta-data.

17. The computer readable storage medium according to claim 13, wherein the content of data includes image data, and the meta-data represents area information that pertains to the image data.

18. The computer readable storage medium according to claim 13, wherein the content of data is one of image data, audio data, and moving image data.

* * * * *